July 2, 1940.  J. W. BRYCE  2,206,219
RECORD CONTROLLED ACCOUNTING MACHINE
Filed May 21, 1932  17 Sheets-Sheet 1

James W. Bryce
INVENTOR
BY Cooper, Kerr & Dunham
ATTORNEYS

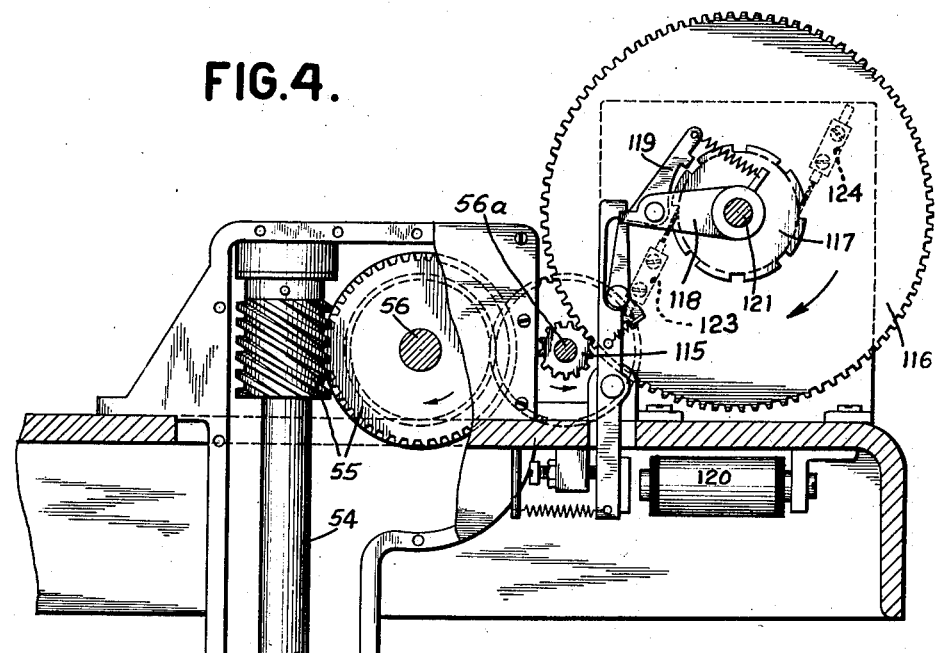
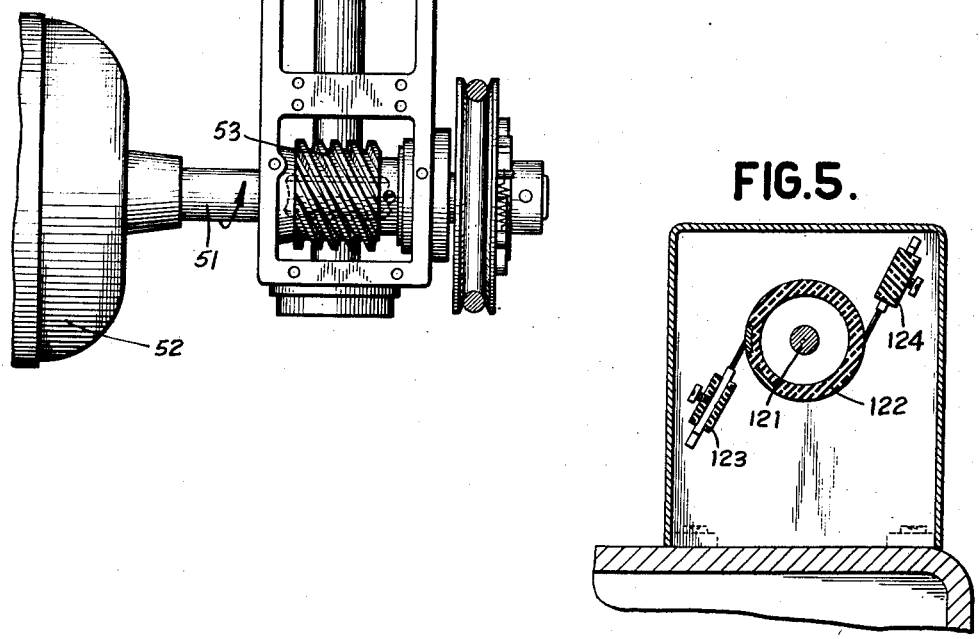

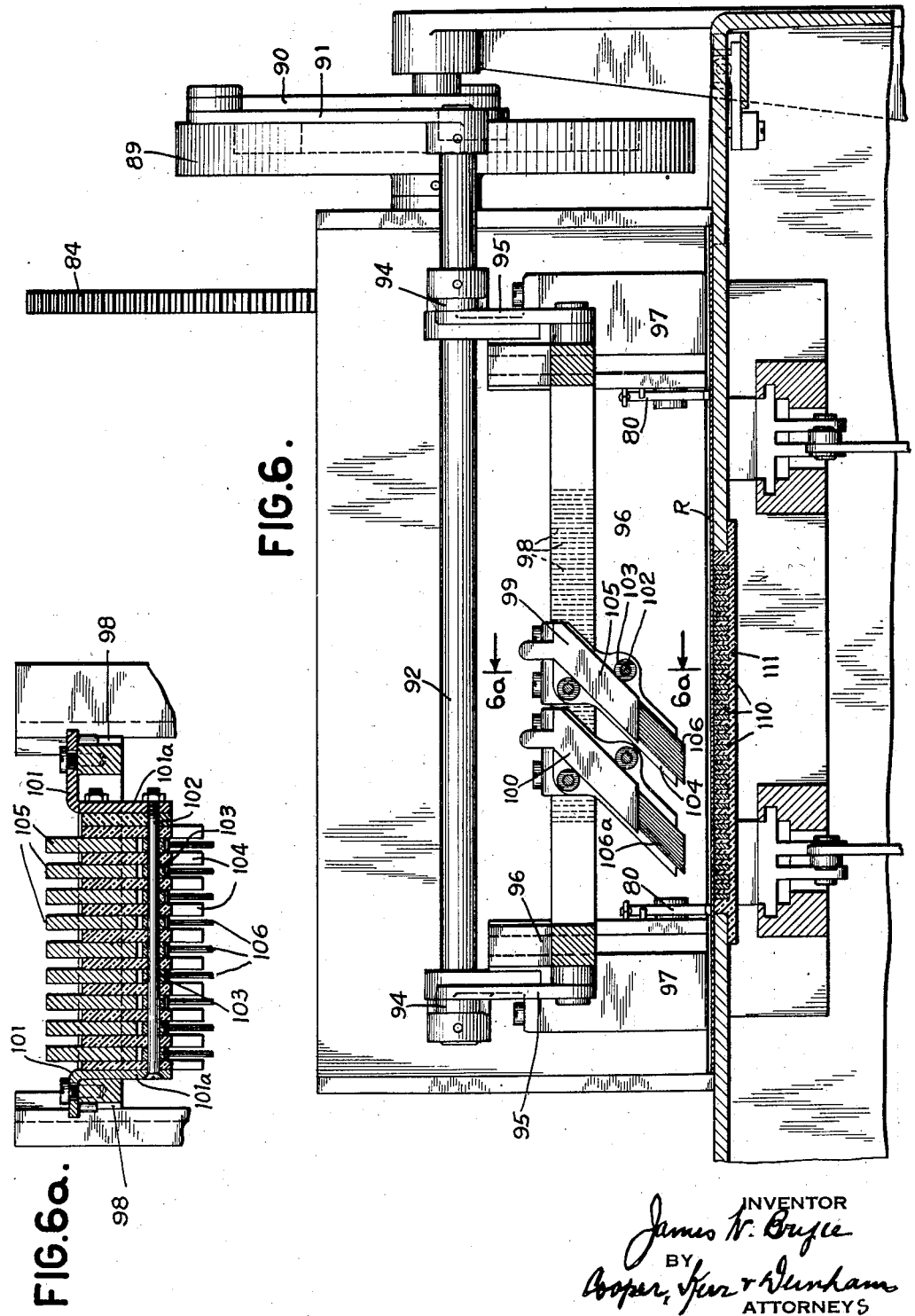

July 2, 1940. J. W. BRYCE 2,206,219
RECORD CONTROLLED ACCOUNTING MACHINE
Filed May 21, 1932 17 Sheets-Sheet 7

INVENTOR
James W. Bryce
BY
Cooper, Kerr & Dunham
ATTORNEYS

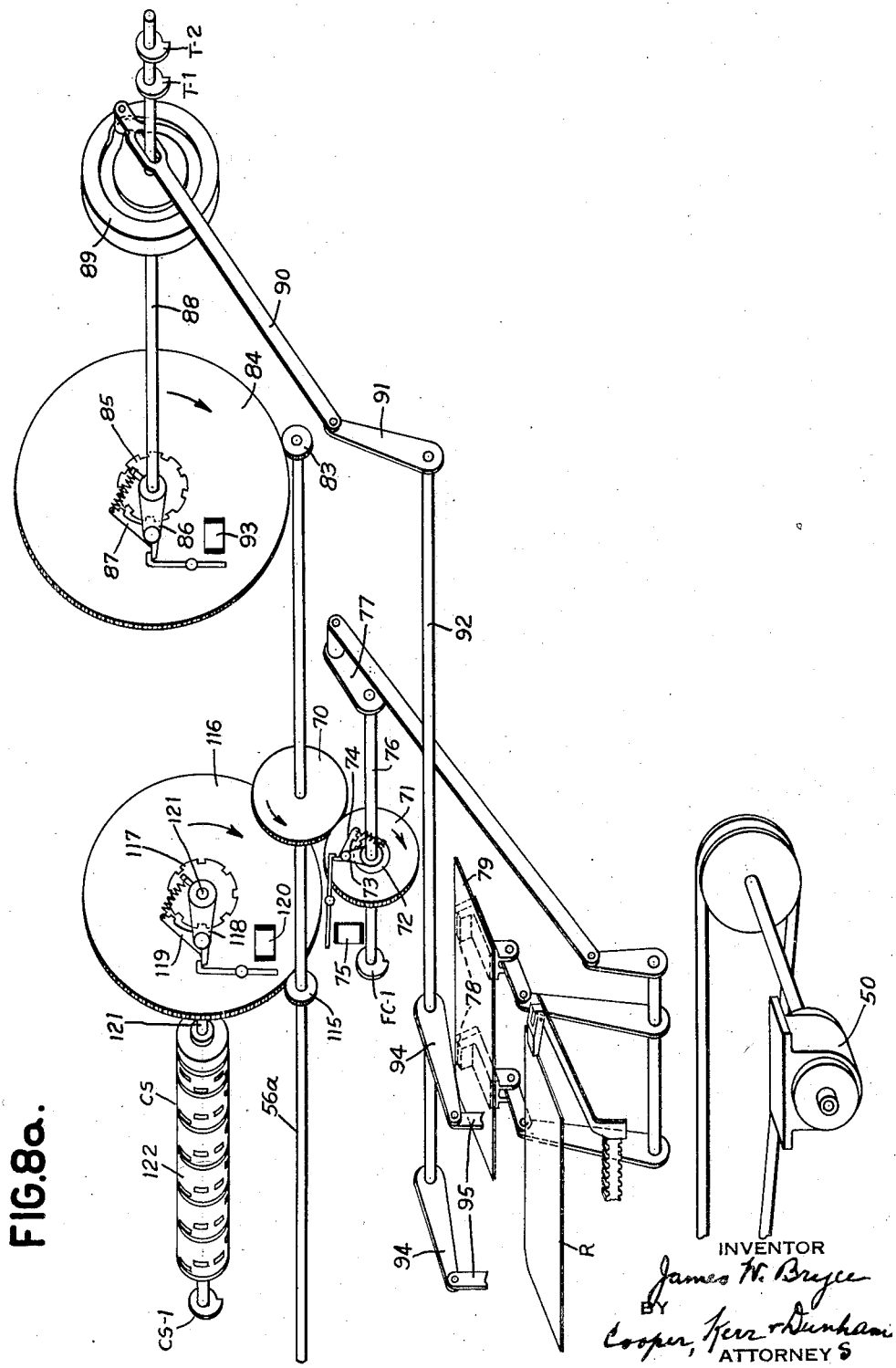

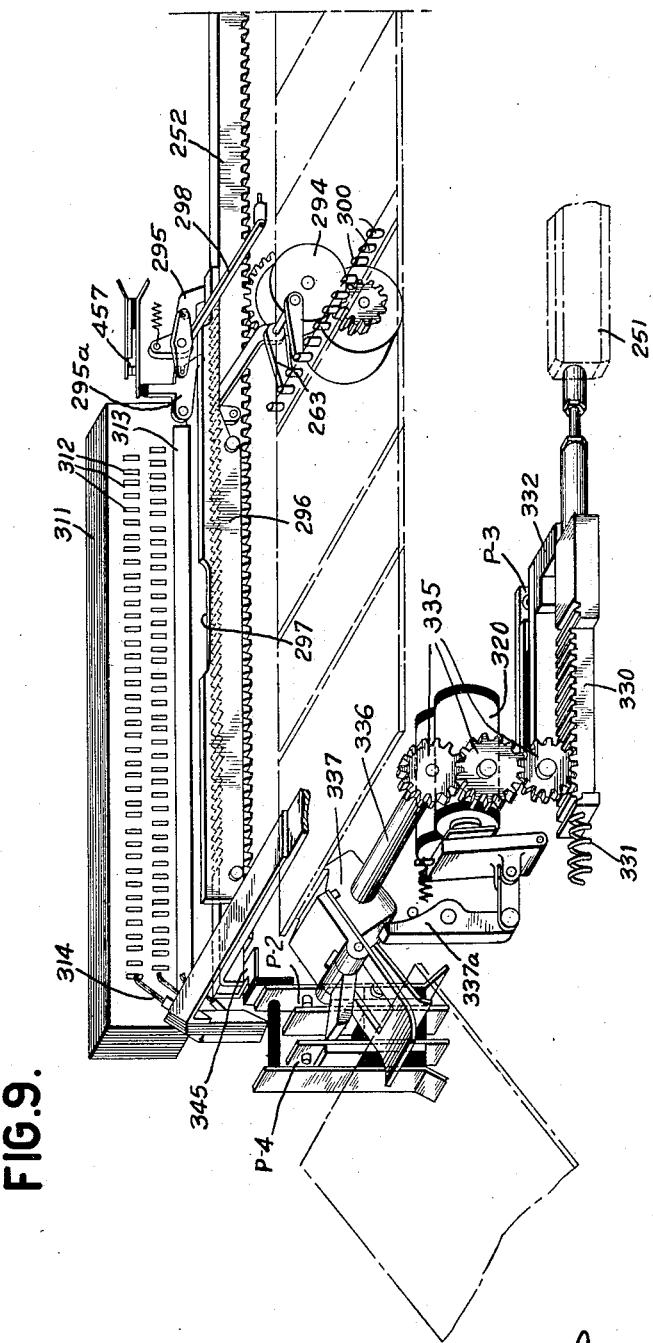

July 2, 1940. J. W. BRYCE 2,206,219
RECORD CONTROLLED ACCOUNTING MACHINE
Filed May 21, 1932 17 Sheets-Sheet 11
FIG.10.
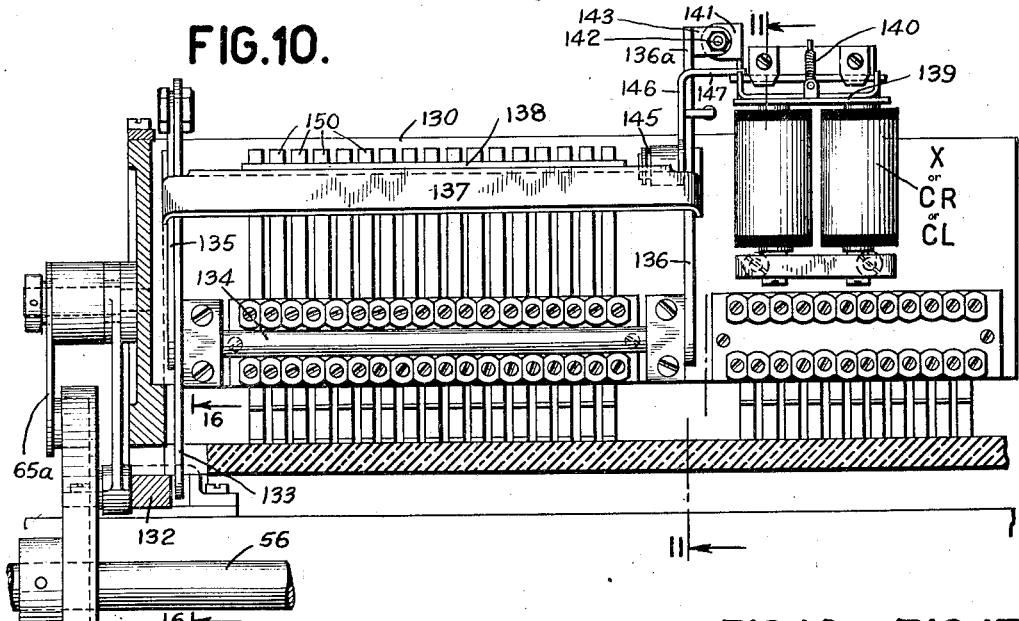
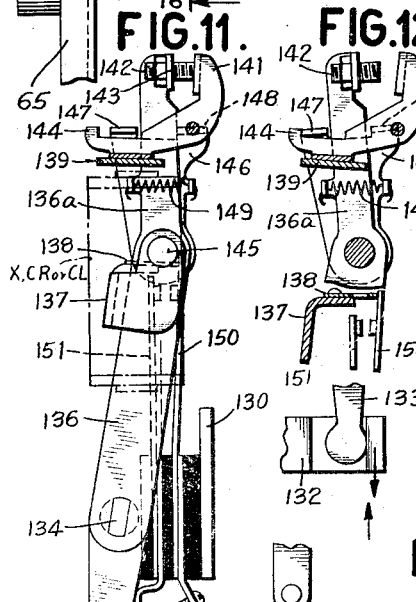
FIG.11. FIG.12. FIG.13. FIG.14. FIG.15.
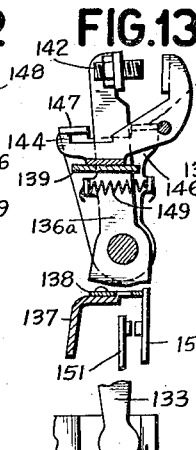
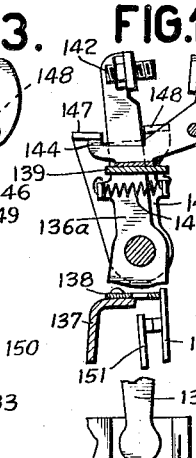
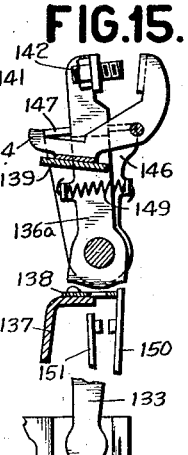
FIG.16.
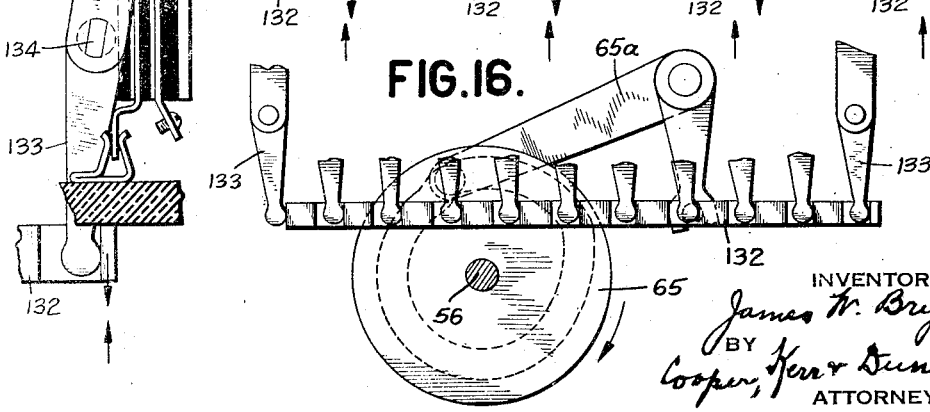
INVENTOR
James W. Bryce
BY
Cooper, Kerr & Dunham
ATTORNEYS July 2, 1940.　　　　J. W. BRYCE　　　　2,206,219
RECORD CONTROLLED ACCOUNTING MACHINE
Filed May 21, 1932　　17 Sheets-Sheet 12
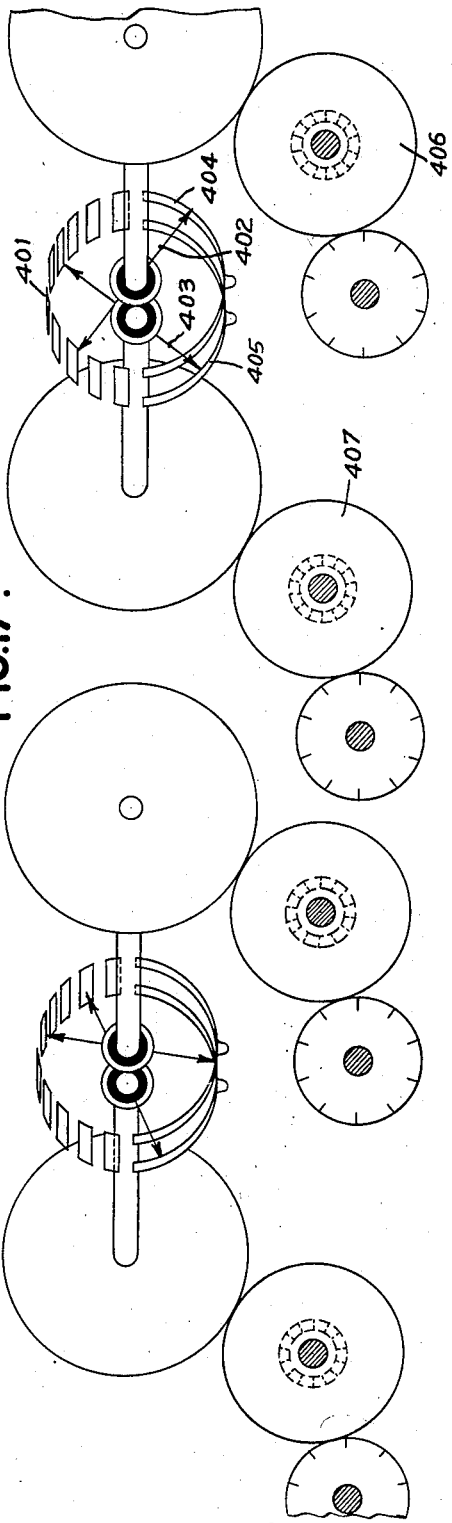
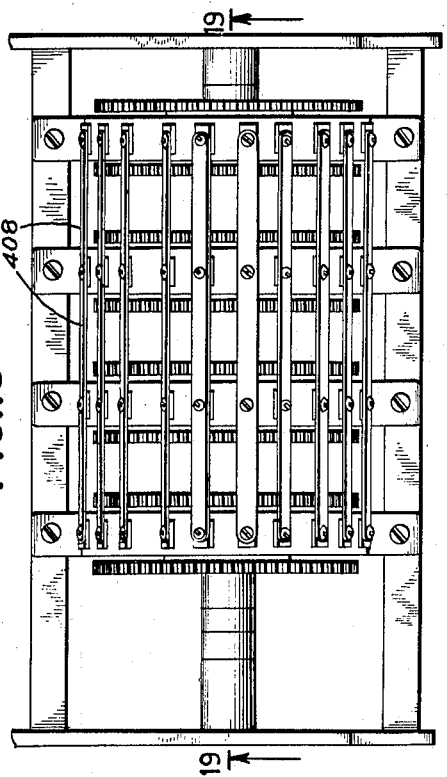
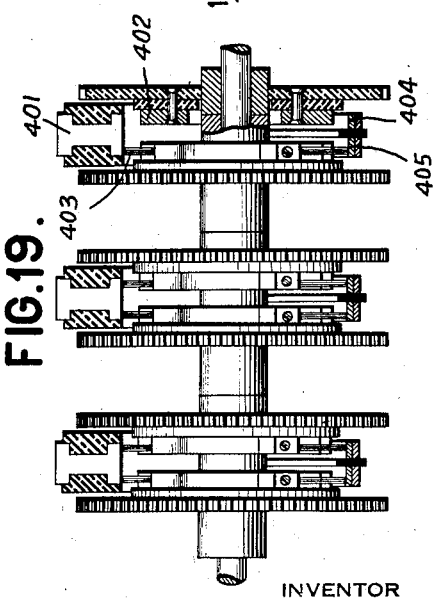
INVENTOR
James W. Bryce
BY
Cooper, Kerr & Dunham
ATTORNEYS

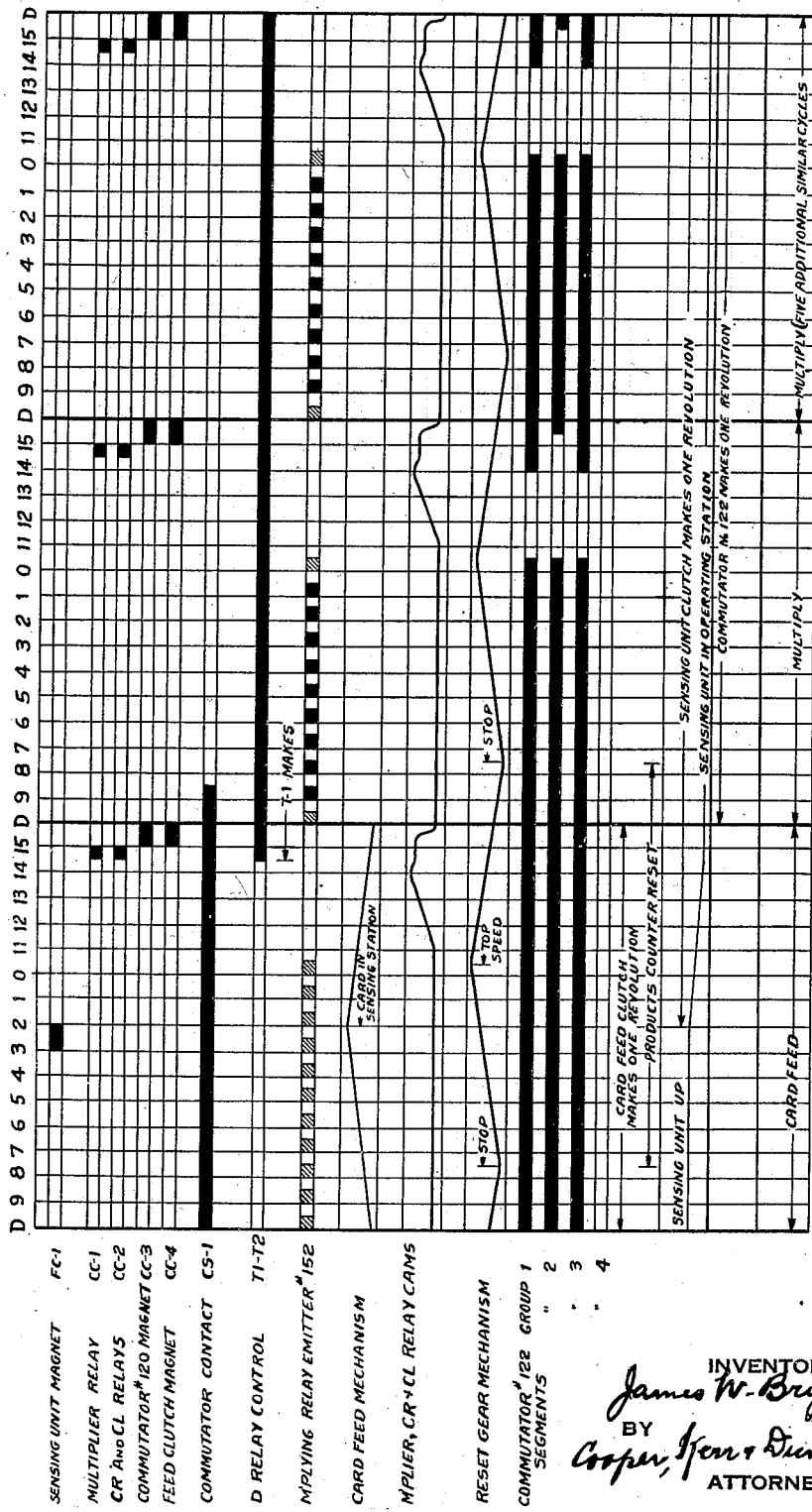

July 2, 1940.  J. W. BRYCE  2,206,219
RECORD CONTROLLED ACCOUNTING MACHINE
Filed May 21, 1932  17 Sheets-Sheet 14

July 2, 1940.   J. W. BRYCE   2,206,219
RECORD CONTROLLED ACCOUNTING MACHINE
Filed May 21, 1932   17 Sheets-Sheet 15

INVENTOR
James W. Bryce
BY
Cooper, Kerr & Dunham
ATTORNEYS

July 2, 1940.                J. W. BRYCE                2,206,219
                  RECORD CONTROLLED ACCOUNTING MACHINE
                    Filed May 21, 1932      17 Sheets-Sheet 16

INVENTOR
James W. Bryce
BY
Cooper, Kerr & Dunham
ATTORNEYS

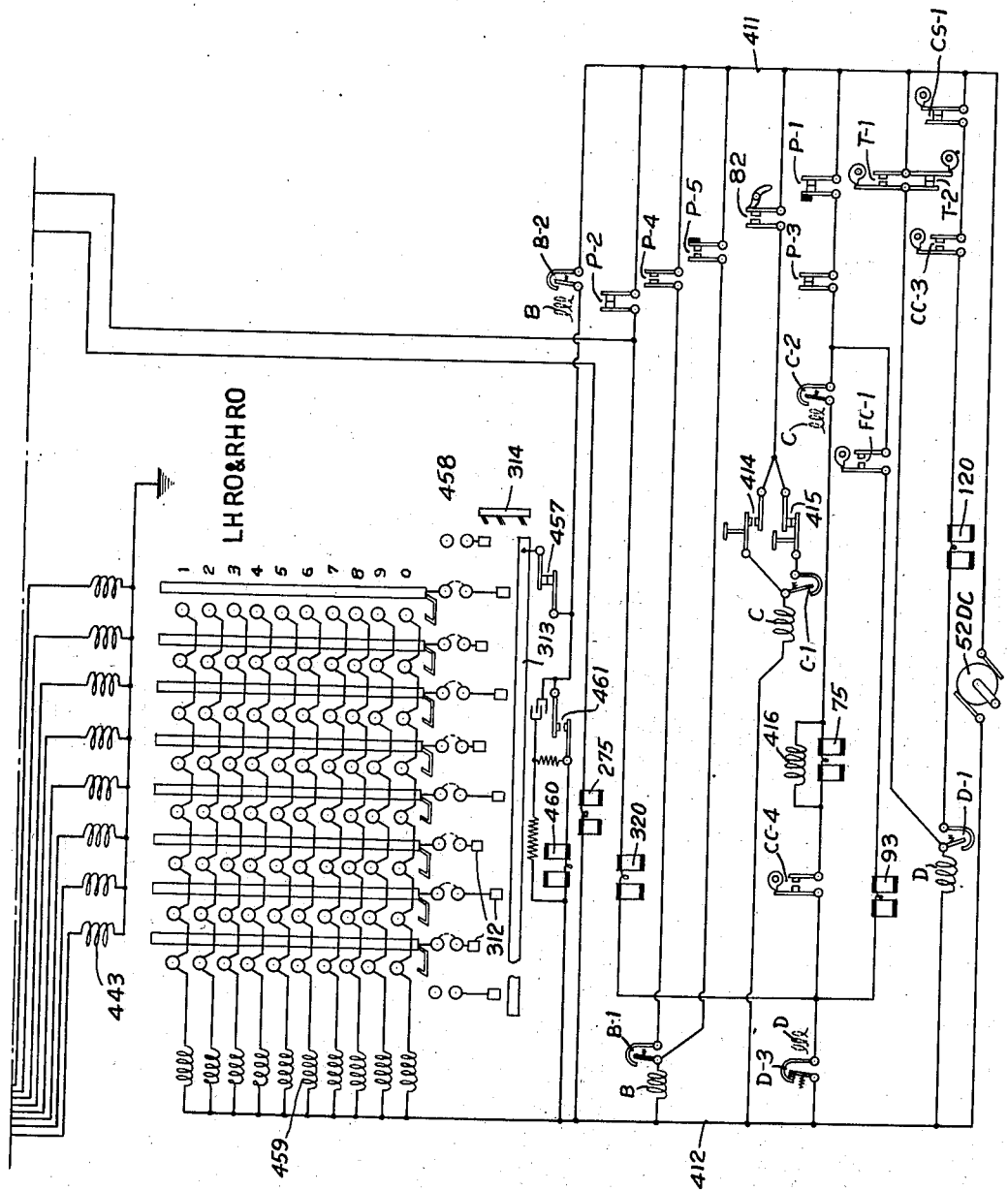

Patented July 2, 1940

2,206,219

UNITED STATES PATENT OFFICE 2,206,219

RECORD CONTROLLED ACCOUNTING MACHINE

James W. Bryce, Bloomfield, N. J., assignor, by mesne assignments, to International Business Machines Corporation, New York, N. Y., a corporation of New York Application May 21, 1932, Serial No. 612,741

6 Claims. (Cl. 235—61.10)

The invention relates to improvements in record controlled and record making accounting machines. In previous machines which I have devised, provision is made for deriving multiplier and multiplicand data from prepunched cards which were placed in the machine. Such previous machines were adapted to derive the data from the cards and set up the amount of the multiplier and multiplicand upon multiplier and multiplicand entry devices. Such devices have heretofore usually taken the form of counters. After the factor amounts were derived from the cards and set up upon the entry receiving devices, the machines were adapted to multiply the entered and set up factor data under the control of such entry devices and then to punch back upon the record, from which such factor data was derived, the product obtained as a result of the multiplying computation.

The present invention is directed to an improved and simplified form of machine wherein in place of utilizing entry receiving devices in the machine such as counters or the like for setting up the factor data, the card itself is utilized as the device or means for retaining the factor data while multiplying computations are being effected.

One object of the present invention accordingly resides in the provision of an improved record controlled accounting machine adapted for multiplication of factors derived from a record card in which provision is made for utilizing the card itself as the instrumentality for controlling multiplication in place of utilizing the card as a means of controlling the entries of factor data into factor entry devices and then utilizing such factor entry devices for controlling multiplication.

A further object of the present invention resides in the provision of a machine arranged to automatically handle a succession of records, which machine is arranged to present the records one by one to a sensing mechanism, to read each record by the sensing mechanism and to retain such record in cooperation with the sensing mechanism while multiplication of the factors is being effected under the direct control of the sensing mechanism and to thereafter feed out the record or card and present a new record or card for sensing and computation.

A further object of the present invention resides in the provision of a machine of the type just set forth in which provision is made for recording upon each record the amount of the product, after a computation has been made under the control of the sensing mechanism, and for effecting such recording upon the feeding out of the record from the sensing mechanism.

A further object of the present invention resides in the provision of an improved record sensing mechanism wherein adjustability and shiftability of the record sensing means is provided to permit the reading of the factor data from variously disposed record card fields.

A further object of the present invention resides in the provision of improved controls of machines of this class to the general end that a proper sequence of the various operations may be secured and to the general end that improper operations may be prevented.

In previous record controlled multiplying machines which I have devised, provisions are afforded for the concurrent entry of left hand and right hand components of partial products into two accumulators. Such a method and means of procedure speeds up the actual multiplying operations but effects such desired result with additional mechanism. Previous machines have also included cycle controllers to eliminate unnecessary computing cycles where zeros appear in the multiplier or where the multiplier contains a relatively small number of significant figures which are less in number than the columnar capacity of the multiplier section of the machine. The use of such cycle controllers also speed up the operation of the machine but require supplemental mechanism or control means to secure such advantages.

Accordingly, a further object of the present invention resides in the provision of a simplified machine in which a single accumulator is provided for receiving the partial products in place of the multiple accumulators heretofore provided in machines of this class. With the single accumulator provision is made for successively entering right and left hand components of partial products into the one and the same accumulator.

A further object of the present invention resides in the provision of a simplified machine wherein no cycle controller is provided and which machine is particularly adapted for the carrying out of computations involving comparatively small multipliers and generally to the provision of a machine wherein simplicity of construction is a desideratum rather than a construction providing the maximum speed of operation with attendant and supplemental extra mechanism.

Further and other objects reside in the provision of an improved record handling and card sensing mechanism, and improved and simplified column shift and entry controlling means all to the general end that the machine may be simplified and constructed with less parts than previous machines.

Further and other objects of the present invention will be hereinafter set forth in the accompanying specification and claims and shown in the drawings which by way of illustration show what I now consider to be a preferred embodiment of my invention.

In the drawings:

Fig. 4 is a detail view showing certain driving parts of the machine and also showing the clutching mechanism for the column shift section of the machine. The section is taken substantially on line 4—4 of Fig. 1;

Fig. 5 is a detail sectional view of the column shift commutator section of the machine, the section being taken substantially on line 5—5 of Fig. 1;

Fig. 6 is a transverse sectional view of parts of the sensing section of the machine. The view is taken substantially on line 6—6 of Fig. 1 and looking in the direction of the arrows;

Fig. 6a is a sectional view showing the sensing brushes and certain of their mounting and associated parts, the section being taken substantially on line 6a—6a of Fig. 6;

Figure 8:
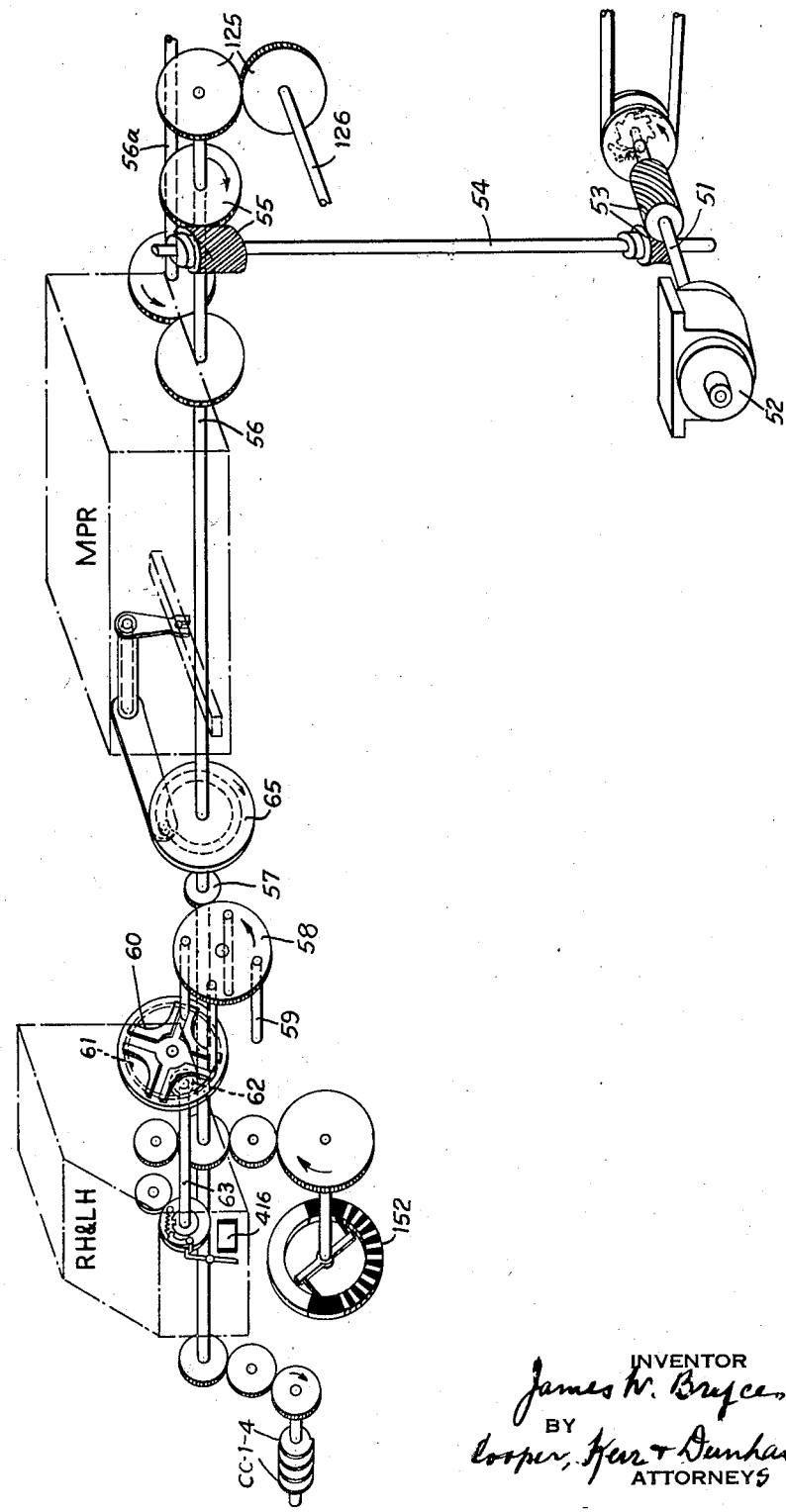
Figure 9A:
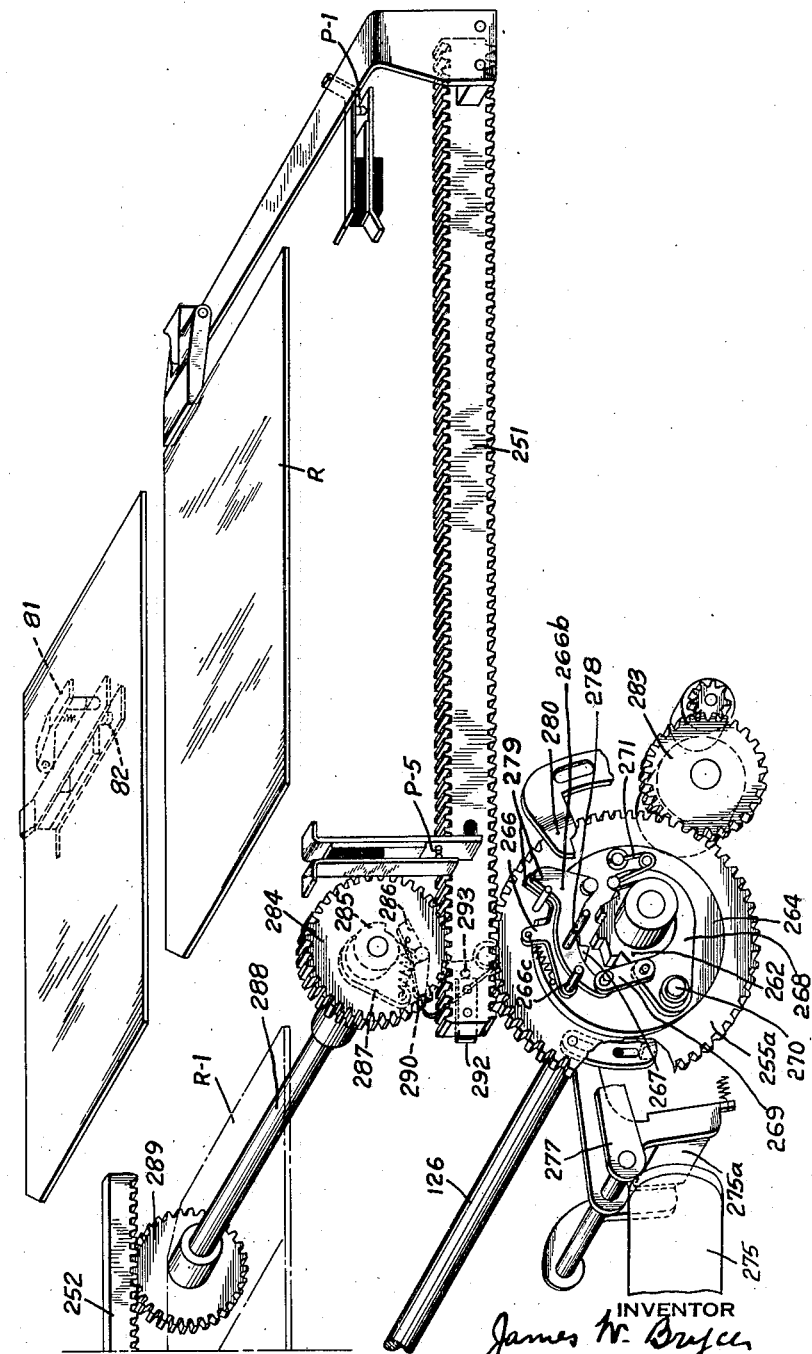
Figure 20A:
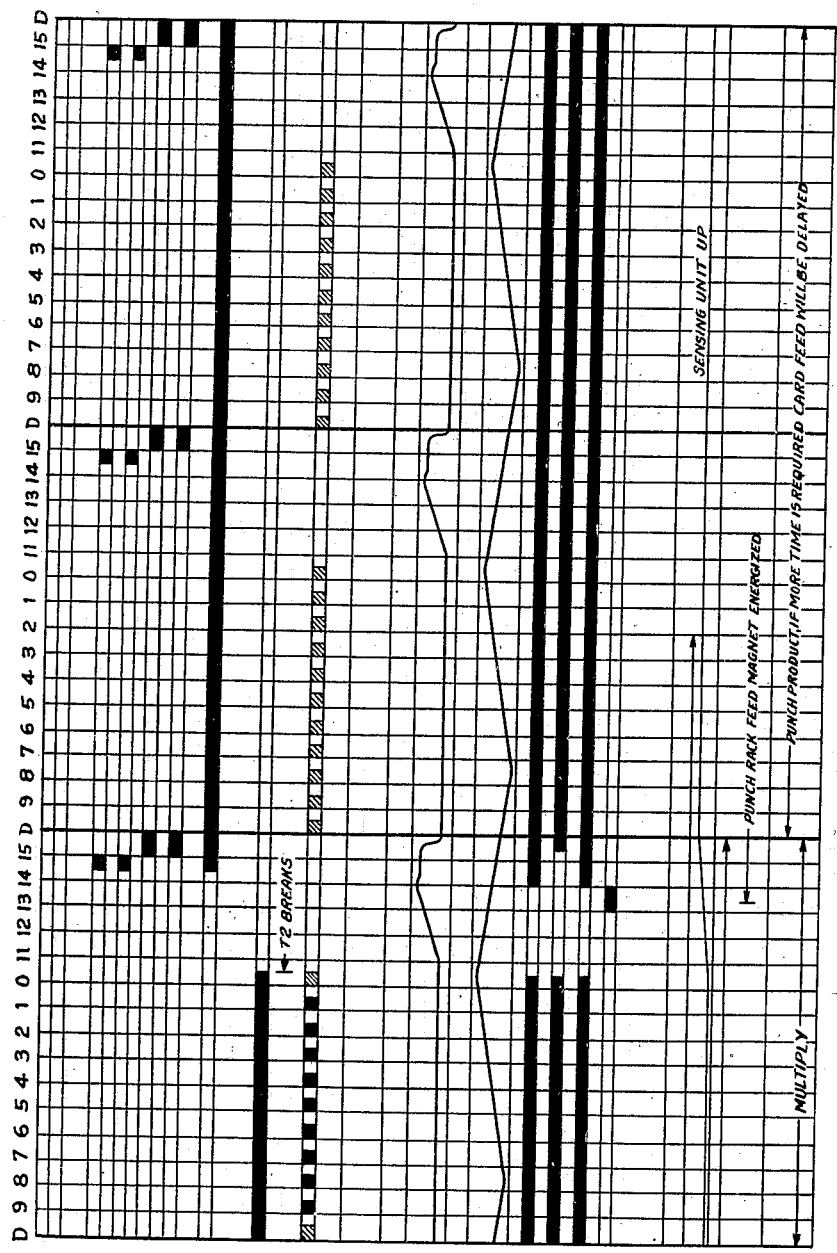

Figs. 8 and 8a taken together, show somewhat diagrammatically the various units of the machine and the driving parts;

Figs. 9 and 9a taken together show an isometric view of the punching section of the machine;

Fig. 10 is an elevational view of one of the multiplying and control relay units used in the machine;

Figs. 11 to 15 inclusive, show positional views of the multiplying and control relay unit parts; Fig. 11 being a sectional view taken substantially on line 11—11 of Fig. 10 and looking in the direction of the arrows;

Fig. 16 is a detail sectional view of certain parts shown in Fig. 10, the section being taken substantially on line 16—16 of Fig. 10 and looking in the direction of the arrows;

Fig. 17 is a diagrammatic view showing the readout devices for the accumulator of the machine;

Fig. 18 is a top plan view of these readout devices;

Fig. 19 is a sectional view taken substantially on line 19—19 of Fig. 18;

Figs. 20 and 20a taken together, show the timing diagram of the machine; and

Figure 21A:
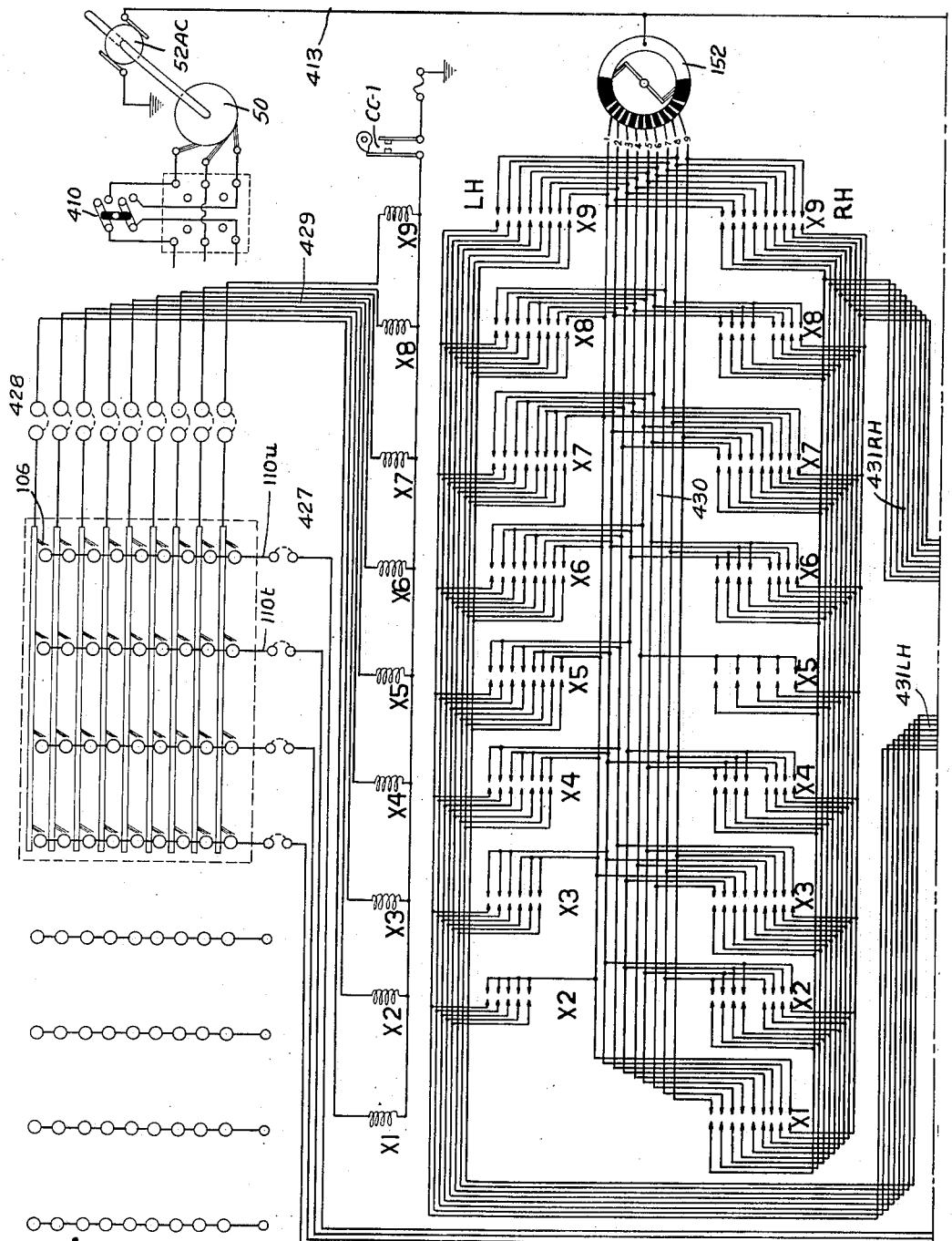
Figure 21B:
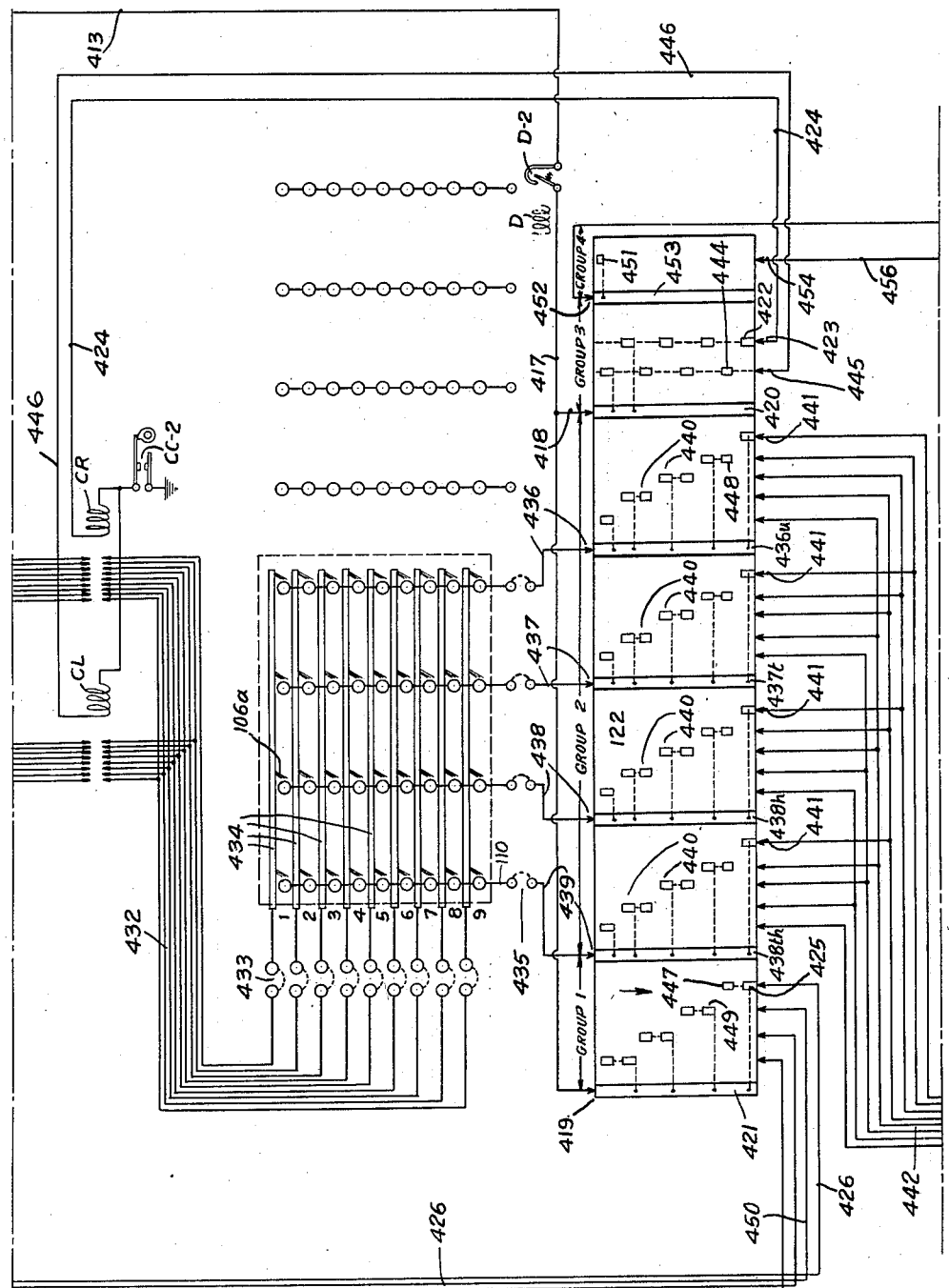

Figs. 21a, 21b and 21c taken together and arranged vertically in the order named show the circuit diagram of the machine.

Before describing in detail the various parts of the machine, a general description will be given of the various units of the machine and of the general mode of operation.

The machine is arranged to take record cards one by one from a supply magazine and advance the same into a sensing section or station. The cards before being placed in the supply magazine are prepunched with the multiplicand and multiplier factor data. After a card is advanced into the sensing section of the machine, the sensing means are brought into cooperation with the card and the card is left in the sensing station during the multiplying computations. Sensing devices establish circuits to the multiplier relays and also circuits to the cycle controller sections of the machine. In this respect the arrangement of this machine generally differs from many of the previous machines of this general type wherein the multiplier and multiplicand are read from the card by brushes and entered into multiplicand and multiplier entry receiving devices in the machine. According to the present invention such multiplier and multiplicand entry receiving devices are dispensed with and in lieu thereof the card is retained at the sensing station while the multiplier and multiplicand data is being derived from the card and while the multiplying computation is being performed.

The machine includes multiplier relays of the usual type. These multiplier relays direct the entry of amounts into an accumulating device. In lieu of entering partial product components concurrently into RH and LH accumulators as heretofore a different and simplified arrangement is employed. According to the present invention a single accumulating device is provided and the partial product entries are effected successively into such single product accumulating and receiving means. Thus the machine enters one RH partial product component in one cycle of operation of the accumulating means and then in a succeeding cycle of the accumulating means one LH component of the partial product is entered into the accumulating device. This operation is repeated for successive orders. To direct the entry of amounts into the accumulator a column shifting mechanism is employed and such column shifting mechanism comprises a commutator. No cycle controller is employed for simplicity of construction. The machine operates with a fixed cycle irrespective of whether or not zeros appear in the multiplier and irrespective of the size of the problem to be computed.

According to the present invention provision is made for handling multiplying computations wherein there are four orders in the multiplier and four orders in the multiplicand.

After the computation has been completed, the card is released from the sensing station and introduced into a punch of the successively acting repetition punching type. In such punch the record card is perforated column by column with perforations which represent the ultimate product standing in the accumulator. The usual resetting and clearing devices are likewise provided.

Figure 1:
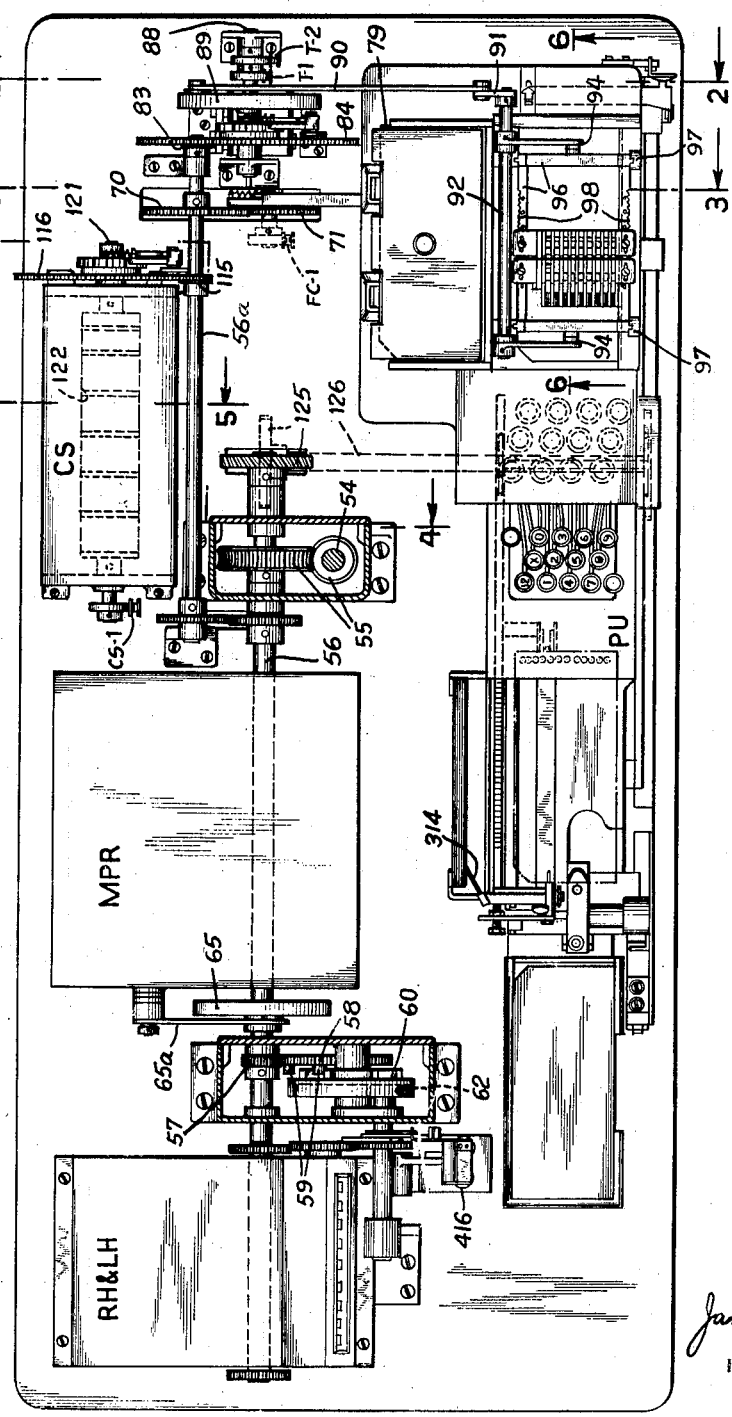
Figure 1 is a top plan view of the machine.

Referring now to Fig. 1, the accumulating device is generally designated RH and LH. The accumulator is a single accumulator used for accumulating both right hand and left hand components of partial products and the accumulator is accordingly designated as RH and LH. The multiplying plate and control relay section is generally designated MPR. The column shift device which as stated before is of the commutator type is designated generally CS. The punching section is generally designated PU.

Referring to Figs. 8 and 8a, the machine is adapted to be driven by motor 50, which through a belt and pulley drive and the usual one-way ratchet drive, drives a shaft 51 which in turn drives the A. C.-D. C. generator 52. Suitable worm gearing 53 drives a vertical shaft 54 which through worm gearing 55 drives a main counter drive shaft 56. The RH and LH accumulator is driven from this counter drive shaft in the customary manner. The drive for resetting this accumulator is effected in the following manner. Shaft 56 is provided with a spur gear 57 driving a gear 58 with a four to one drive ratio. Gear 58 has extending from it four Geneva pins 59 cooperating with the other or cross element of the Geneva generally designated 60. Secured to element 60 is an internal gear 61 which gear has cooperating with it a spur gear 62 mounted on the end of the reset shaft 63. The reset shaft is provided with the usual electromagnetically controlled one revolution clutch and effects reset of the accumulator in the customary manner. Shaft 56 is also provided with a cam 65 which through a cam follower is adapted to operate certain parts of the multiplying plate and control the relay unit of the machine.

*Card feed and card handling unit drive*

Driven concurrently with the counter drive shaft 56 and in time therewith through one to one gearing shown in Fig. 8, is another shaft 56a. Such shaft 56a extends over to the right and drives the card handling section of the machine, the sensing section of the machine and the column shift section of the machine. The drive for the card handling section will first be described.

Figure 2:
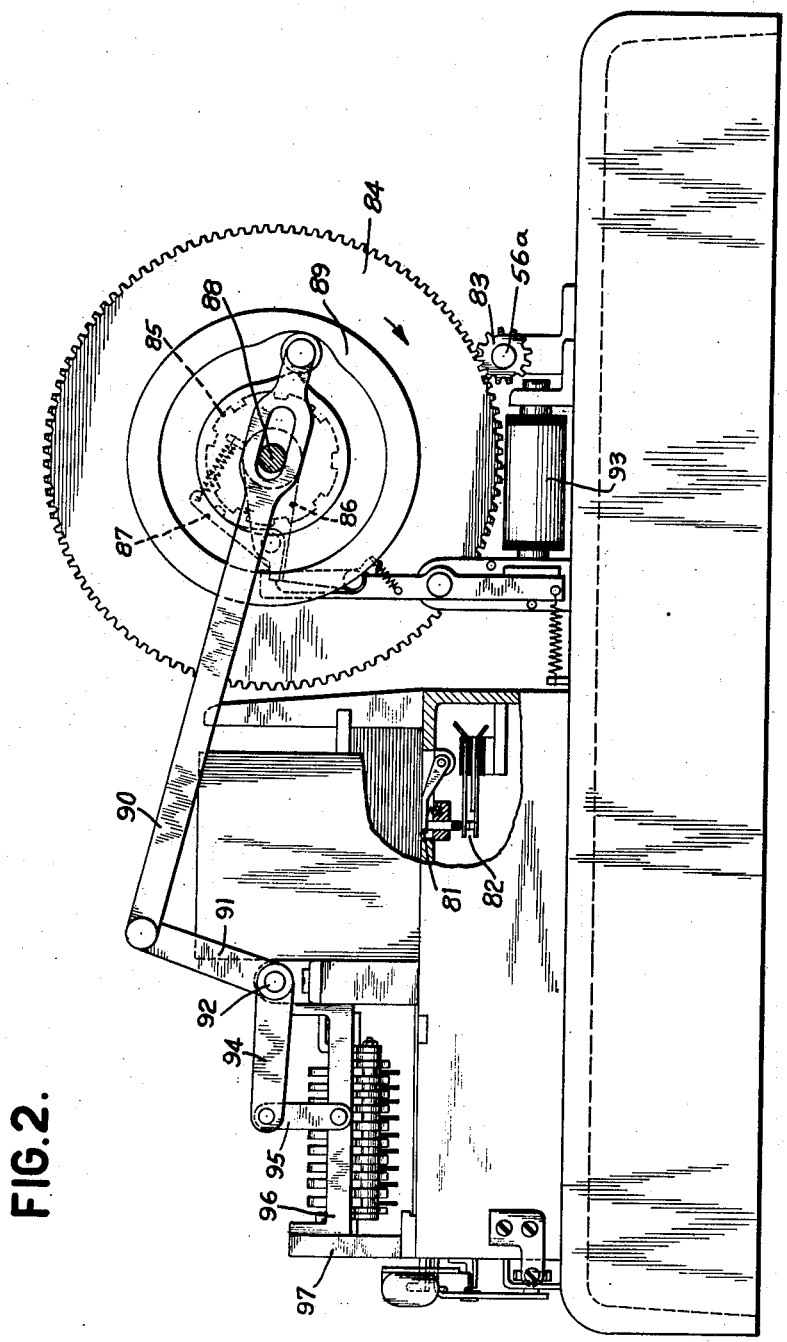
Fig. 2 is a detail sectional view showing the actuating mechanism for the sensing section of the machine. The section is taken substantially on line 2—2 of Fig. 1.
Figure 3:
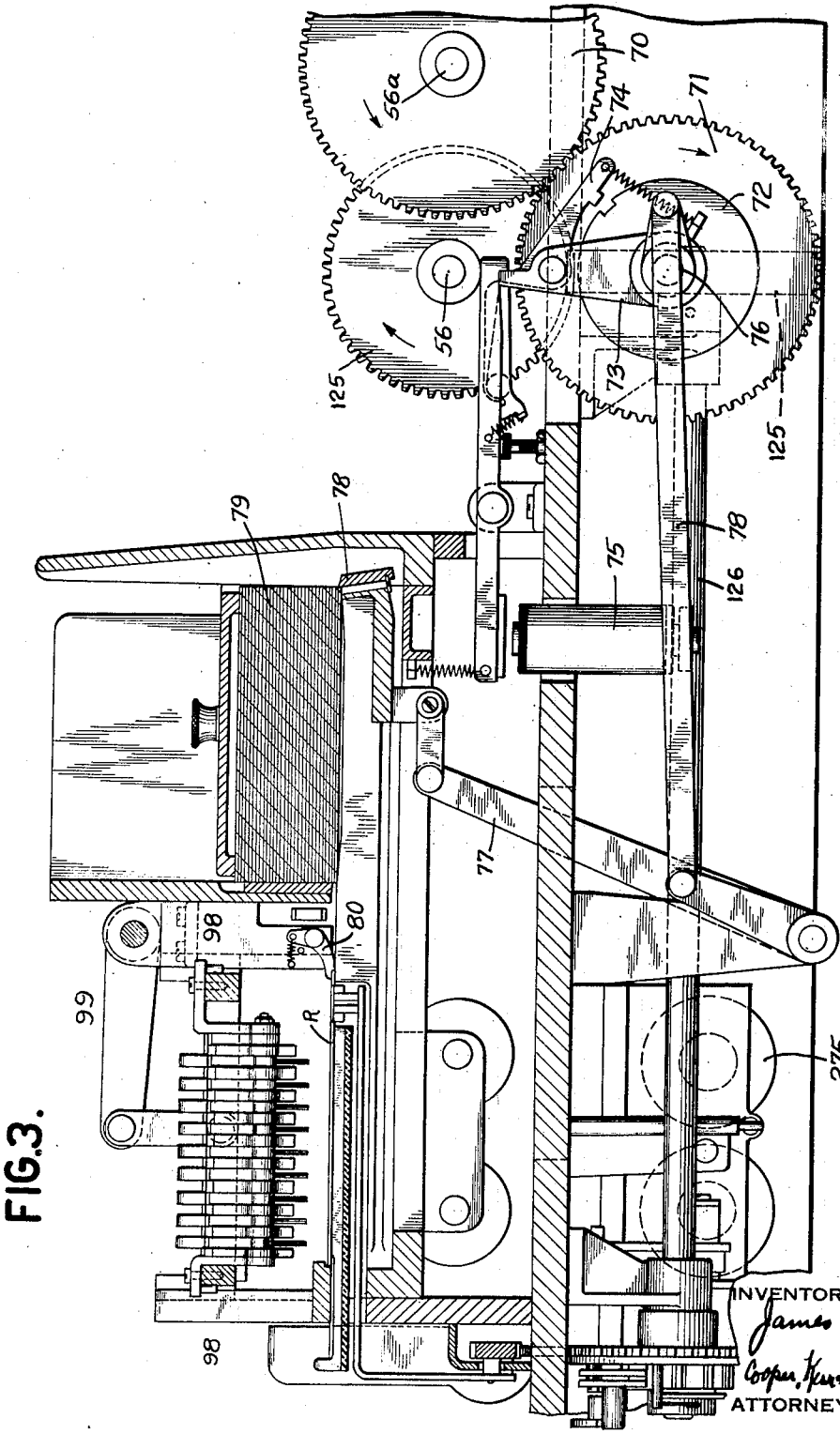
Fig. 3 is another detail sectional view showing the card feed parts and portions of the sensing devices of the machine, the section being taken substantially on line 3—3 of Fig. 1.

Referring to Figs. 3 and 8a, shaft 56a through a gear 70 drives a gear 71. Gear 71 has secured to it the notched disk element 72 of a one revolution clutch. The other element of this one revolution clutch comprises the member 73 carrying a clutch dog 74. Clutch dog 74 is adapted to be tripped by means of a magnet 75. Member 73 is fixed to a shaft 76, which shaft through crank and linkage connections generally designated 77, is adapted to actuate picker knives 78. Upon engagement of the one revolution clutch the picker knives in the usual manner withdraw the lowermost card from a supply magazine 79 and advance the card directly over to the sensing station of the machine. The position of the card at this sensing or reading station is designated at R in Fig. 8a (see also Fig. 3). When the card is in this R position it is retained in such position by means of pawls 80 (Figs. 3 and 6). A suitable card lever is placed under the supply magazine 79, such card lever being shown in Fig. 9a in dotted lines and indicated at 81 (see also Fig. 2). Such card lever is adapted to close card lever contacts 82 when cards are in the magazine and to allow such contacts to open upon the exhaustion of cards from the magazine.

The above arrangement of picker is adapted to remove a card from the card magazine and place it in the sensing station of the machine. The drive for the sensing mechanism parts will now be described.

Figure 7:
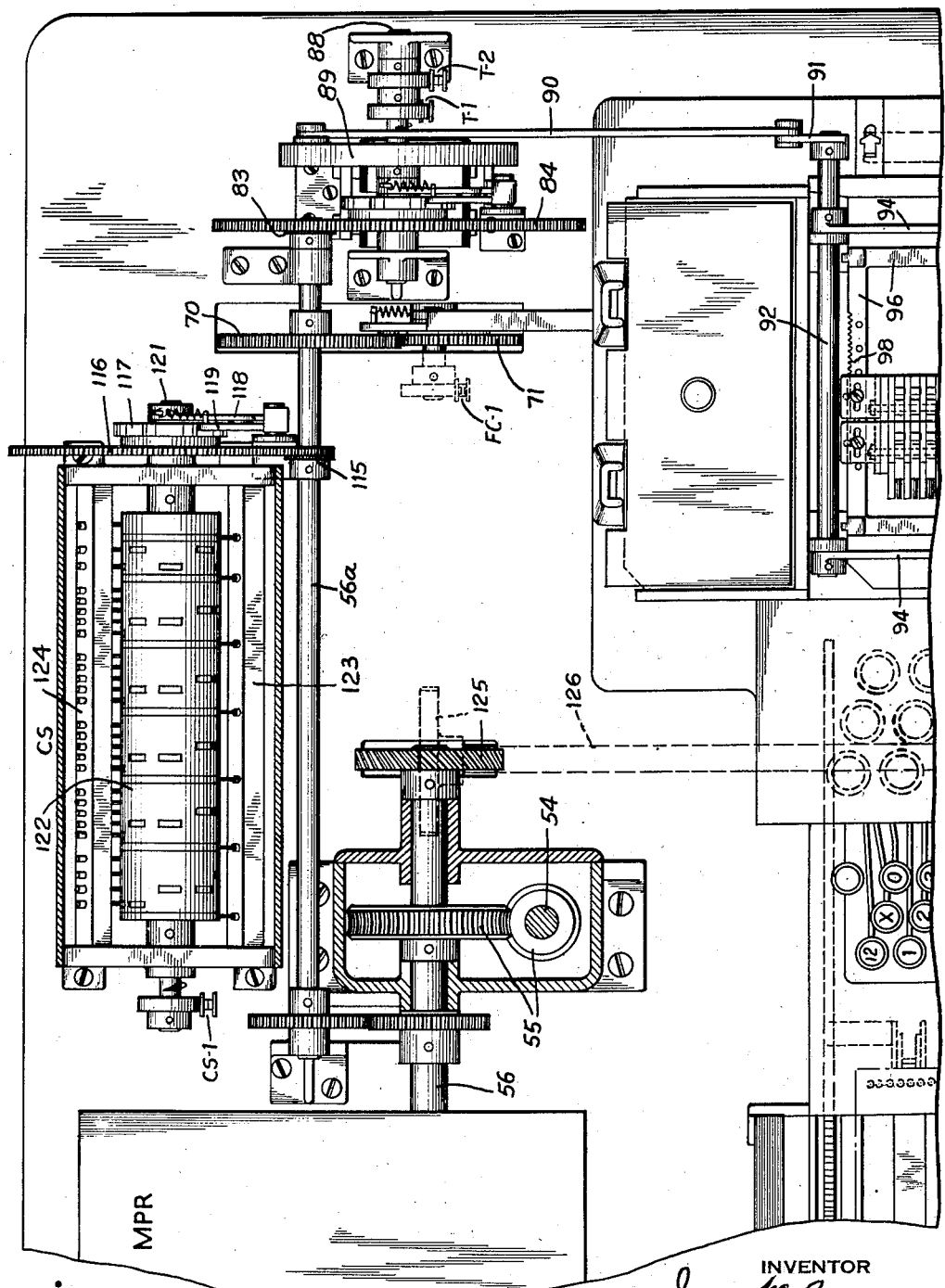
Fig. 7 is an enlarged top plan view of certain parts shown in Fig. 1, but with certain housing parts broken away.

Referring to Figs. 2 and 8a, shaft 56a is provided with a small gear 83, which gear drives a larger gear 84 with a one to nine drive ratio. Fixed to gear 84 is the notched element 85 of a one revolution clutch. The other elements of this one revolution clutch comprise a pawl carrier 86 carrying the usual pawl or clutch dog 87. Member 86 is fixed to a shaft 88 which has secured to it a cam 89. A cam follower 90 cooperates with this cam and through a suitable arm 91 is adapted to rock a sensing shaft 92. The sensing mechanism is called into action by the energization of the electromagnet 93, which magnet upon being energized releases the one revolution clutch. Shaft 92 (see Figs. 1, 2, 6 and 8a) carries a pair of arms 94 which are provided at their ends with depending links 95, which extend downward and connect with a rectangular frame generally designated 96, which frame is vertically slidable in posts 97 (see Fig. 1). The front and rear members of the rectangular frame 96 are notched as shown at 98 (see Figs. 3, 6 and 7), the notches of these bars being arranged to match the columns of the card to be sensed. Spanning the space between the front and rear members of the rectangular frame and clamped thereto are brush supporting assemblies 99 and 100. Inasmuch as these assemblies are identical, one of them will be described. Each assembly 100 comprises two members 101 (Fig. 6a) having downwardly depending portions 101A. Members 101 are clamped together by through studs 102, which through studs extend through insulating sleeves 103. Between the insulating sleeves in alternating relation are insulating dam members or insulating spacers 104 and brush carriers 105 carrying brushes 106. It will be understood that a similar arrangement of parts applies for the assembly 100. The brushes of this assembly will have a distinctive reference character, viz., 106a.

The arrangement of the brushes 106 and 106a is such that they are adapted to span four columns of the card. Separate brushes for the individual columns can be provided but inasmuch as the columns are comparatively close together, wide brushes preferably may be used to span the multiplicity of columns.

Disposed under the record card at the R position in the sensing station, are transverse buses or contact strips 110. Such buses or contact members are individually insulated from one another, by insulation 111 (see Fig. 6). One of these conducting blocks 110 is provided for each individual column and a multiplicity of such common contact blocks or strips are provided as shown in Fig. 6. In the embodiment shown in Fig. 6, 34 of such contact strips are provided. Any number, however, can be used, but their spacing will be dependent upon the columnar spacing on the index points of the card. It will be understood that the brush supporting assemblies 99 and 100 can be shifted on the rectangular frame to the desired card columns. Furthermore, the assemblies 99 and 100 can be removed and replaced in reverse relation, that is 99 can be placed in the position assumed by 100 and 100 can be placed in the position assumed by 99 in Fig. 6.

It will be understood that with the linkage 90, 91, shaft 92, part 94 and links 95 shifted, that the sensing devices will be brought down into contact with the card and that the brushes 106 and 106a will establish contact through the perforations in the card with the common bars or strips 110. It will be understood that there is an individual brush 106 for each index point from nine to one of the record card. The sensing arrangement therefore comprises eighteen individual brushes, each brush spanning four columns transversely of the card, nine brushes being provided for reading the four multiplier factors and nine brushes being provided for reading the four multiplicand factors.

*Column shift drive*

Referring to Figs. 4 and 8a, the shaft 56a is provided with a pinion 115, which meshes with a larger gear 116, the drive ratio being one to eight. Gear 116 carries the tooth element 117 of a one revolution clutch, the other parts of which comprise a dog carrier 118 carrying the usual clutch dog 119 which is tripped into engagement with 117 by energization of magnet 120. Member 118 of the one revolution clutch is fixed to a shaft 121, which shaft extends through the gear 116, such gear 116 rotating freely on this shaft and which shaft 121 has fixed thereto the CS column shift commutator 122. Cooperating with the commutator 122 are two sets of brushes which will be generally designated 123 and 124 (see Figs. 5 and 7). The commutator roll 122 is made of insulating material and is provided with a number of conducting segments, the relation of which will be more fully described in connection with the description of the circuit diagram. Also disposed on the column shift commutator shaft 121 is a cam for operating the CS—1 contacts.

*Drive to punching section of the machine*

Referring to Fig. 8, shaft 56 through gearing generally designated 125, is adapted to drive a punch drive shaft 126.

The punching mechanism will be subsequently described.

*Multiplying relays and multi-contact control relays*

The multiple contact, multiplying and control relays which are used in this machine are those of the type customarily used in multiplying machines of this general class. Such relays are more fully described in the United States patent to George F. Daly and James M. Cunningham, No. 2,097,145, dated October 26, 1937.

Suitable frame plates provided in the MPR section of the machine are slotted to receive a number of vertical plates 130 (Fig. 10). Carried on each plate is a magnet generally designated X when the relay is used for multiplying selection purposes and designated CR or CL when used for mere controlling selection purposes. These magnets X or CR or CL when energized, serve to control the multi-contact relay points. Preferably the magnets X, or CR, or CL are used as trip magnets only and the armatures of these magnets are not required to actually shift their related multi-contacts. Furthermore provision is made for relieving the strain from the armature latches at the time of release of the armature latches.

It has been previously explained that a cam 65 is provided on shaft 56 and such cam has a follower mechanism generally designated 65a. 65a through a suitable linkage connects with a serrated operating bar 132. The serrated operating bar 132 (Figs. 10 and 16), is slidably mounted and disposed below and at one side of the base of the controlling relay section of the machine and into the serrations of this bar extend arms 133 of a contact operating bail structure. Each arm 133 is fixed to the end of a rock shaft 134 which is suitably journaled in brackets carried by the plate 130. Fixed to shaft 134 at its opposite ends are upstanding arms 135 and 136. Arm 135 is also fixed to arm 133 and spanning 135 and 136 and fixed thereto is a cross member 137 which on its upper surface carries a strip or bail of insulating material 138 (see Figs. 11 and 12). Arm 136 extends upwardly beyond 137 and this upward extending portion of 136 will be designated 136a. Arm 136a is utilized for knocking off the armatures and it also controls certain of the latching operations as will now be described. The magnet generally designated X, CR, or CL is provided with a pivotally mounted armature 139 which is spring retracted away from the magnet by spring 140. The armature 139 also is provided with an upstanding portion 141 (see Fig. 11) which portion is in alignment with a screw 142 carried by bent over portion 143 of arm 136a.

By referring to Fig. 11, it will be noted that if the serrated operating bar 132 is in the position shown, that arm 133 will be rocked in a clockwise direction swinging arm 136a clockwise causing the screw 142 to abut against 141 and restore and knock off any previously attracted armature. Each armature 139 is provided with a latch portion 144 and pivotally supported upon member 136a upon a stud 145 is a forked member 146. As shown in Fig. 10 the forked member 146 is disposed to the left of the arm 136a and the forks of this member 146 are turned over and pass the sides of 136a. One of these forked portions is designated 147 on Fig. 10 and this forked portion extends over and cooperates with the latch point 144 on armature 139. The other fork 148 is disposed upon the opposite side of member 136a (see Fig. 11). A spring 149 is provided which is fastened at one end to the right hand fork 148 of the forked member 146, which spring is also fastened to the arm 136a. The action of spring 149 is such that it tends to rock the forked member 146 anti-clockwise with respect to 136a. After the armature has been restored and knocked off in the manner indicated in Fig. 11, the serrated operating bar 132 by the action of cam 65 is shifted slightly to the right (note the arrows at the bottom of Fig. 12). Shifting of the serrated operating bar 132 to the right allows arms 133 to follow the serrated operating bar. Such following action is brought about by the spring pressure of the set of contact blades 150. This slight movement of 133 to the right swings 136a slightly to the left to a position in which there is slight clearance between part 147 and member 136a (see Fig. 12). With the parts in this position the spring strain of contacts 150 is removed from the latch point 144. The latch may now be released by attracting the armature by energizing the magnet X, CR or CL. Upon energization of such magnet the action of spring 149 causes the forked arm 147 to snap over the top of the latch point 144, the parts now taking the position shown in Fig. 13. The next action is the actual closing of contacts 150 with 151. This is the position of parts shown in Fig. 14. With this condition of parts the cam 65 has turned to a further extent permitting a further shifting of the serrated operating bar 132. The arm 133 then swings to its extreme anti-clockwise position under the action of spring contacts 150. The insulating bail 138 moves to the left and allows contacts 150 and 151 to close.

The further operation comprises the knocking off of the armature as shown in Fig. 11 by the movement of the serrated bar 132 to the left. The movement of this bar positively opens up contacts 150 and 151 against the tension of the blades 150.

Fig. 15 shows the relation of parts upon an operation when no trip of an armature has been effected magnetically. In this case the latching nose 144 cooperates with the forked arm 147 and prevents 136a swinging to the left beyond the latching point. It will be noted that 136a in this figure is in contact with the right hand side of 147. With this position of the parts the contacts 150 and 151 will be kept open.

Summarizing, the above multi-contact arrangement provides the following desirable features.

Contact pressure is removed from the latch point prior to the releasing of the latch magnetically. The multiple contacts are opened by a positive mechanical action of the serrated operating bar. The armatures are positively knocked off by a positive cam operation of the serrated operating bar. The timing of contact closure under the Fig. 14 condition can be definitely controlled by the timing of the cam 65.

Summarizing, the construction provides accurate timing of contact operation with very slight load on the latch points at the time of armature actuation under energization of the control magnets X, CR or CL.

In the present embodiment nine of such assemblages are employed for multiplying relay purposes and two assemblages controlled by magnets CR and CL are employed for control selection purposes. The machine also includes an emitter of conventional construction and a number of cam contact devices. The emitter is shown in Fig. 8 at 152 and such emitter is driven from the main counter drive shaft 56 in the conventional manner. Also shown in Fig. 8 are a number of cams for operating the CC group of cam contacts. These will be designated CC—1 to CC—4 inclusive, corresponding to the showing on the circuit diagram. Certain cam contacts are also associated with the picker actuated parts. The cam of such contacts is designated FC—1 (Fig. 8a) to correspond with the showing on the circuit diagram and such cam FC—1 is disposed on the shaft 76 (Fig. 8a). Cam contacts T—1 and T—2 are also provided, the cams of which are also disposed on shaft 88 (Fig. 8a).

*Punching mechanism*

In general the punching mechanism is of the successive column acting repetition punching type.

The punching mechanism generally is of the form shown in the Lee and Phillips United States Patent No. 1,772,186 and also of the form shown in the United States Patent to Lee and Daly, No. 1,976,618, (British Patent No. 362,529). Certain features of the punch are also shown and more fully described in the United States Patent to Daly, No. 1,950,485. Other features of the punch are shown in patents to Schaaff, No. 1,803,979, dated May 5, 1931, and No. 1,821,078, dated September 1, 1931.

The punching machine (see Figs. 9 and 9a) includes two card feed racks 251 and 252, 252 has suitable pusher fingers 263 attached to an arm carried by the rack 252. The shaft 126 previously to, has a ratchet shaped clutch element 262 fixed on the end thereof. Alongside of 262 is a gear 255a which meshes with the lower teeth of rack 251. Secured to gear 255a is a disk 264. Pivoted on this disk 264 is a member 266 provided with a ratchet shaped clutch tooth 267. Alongside of member 266 is another member 266b which lacks the clutch tooth. On 266 is a pin 266c overlying an arcuate surface of 266b. The free end of 266b is connected to a toggle member 268 by a link 269. 268 is pivoted on disk 264 at 270. The opposite end of 268 remote from its pivot 270 is connected to a spring element 271. Spring 271 tends to hold the clutch tooth 267 out of engagement with the clutch teeth of element 262 and allows it to engage when 268 is shifted.

For the purpose of effecting a clutching action punch feed clutch magnet 275 (Fig. 3 and Fig. 9a) is provided. This magnet when energized attracts its armature 275a (Fig. 9a) causing an arm 277 to engage the pin 278. (In Fig. 9a the pin engaging extension of this arm 277 is shown broken off for clarity of illustration of the other parts). Arm 277 upon engaging pin 278 depresses part 266b allowing 266 to descend so that the tooth 267 engages with the ratchet element 262. Upon such engagement the gear 255a will be driven in a counterclockwise direction substantially a single revolution, shifting rack 251 to the left. When this action occurs the card pusher shown in Fig. 9a, will move the card from the R position, which is the position in the sensing station of the machine, to the R—1 position.

At the termination of the counterclockwise movement of gear 255a, the tails 279 of parts 266 and 266b will strike a projection 280 on a fixed plate to effect the disengagement of the tooth 267 from the ratchet wheel 262. This action also restores the toggle parts to normal position. It will be understood that the tails 279 do not actually pass the fixed projection 280 but are merely intercepted by such projection and later retreat away from the projection in a clockwise direction under the power and the spring in barrel 283.

The above driving action has wound up a spring in barrel 283. Upon disengagement of the one revolution clutch 267 previously referred to, rack 251 returns to the right under the influence of the spring power of the spring in barrel 283.

The driving train to the second card carriage rack 252 will now be described. Rack 251 has its upper teeth intermeshed with gear 284. Gear 284 has secured to it a member 285 having a single notch or tooth disposed in the plane of a pawl 286 which is pivoted on a part 287 fixed to the shaft 288. Shaft 288 on its opposite end has a gear 289 which meshes with card carriage rack 252. Suitable mechanism controls the coaction of the pawl 286 with the member 285 so that with the rack 251 in extreme right hand position pawl 286 will be disenagaged from the clutch element 285. Such disengagement is effected by the rocking of 290 in a clockwise direction by the coaction of the pin 293 with a block 292 carried on rack 251. Upon initial movement of 251 to the left the block 292 will clear the pivoted camming element 290 allowing a slight counterclockwise motion of it so that 286 under spring action may engage and rock into the tooth or notch of member 285. Thereafter drive will come from 251 through gear 284, through 285 to pawl 286 to 287, shaft 288, so that a clockwise rotational movement will be imparted to 288. This action will, through gear 289, traverse rack 252 to the right. The card carriage rack 252 will thus be shifted to extreme right hand position permitting the card pushers 263 (Fig. 9) to first ride over the surface of the card and the pushers and ultimately engage back of the trailing edge of the card at the R—1 position. Rack 252 has associated therewith a spring driving device comprising the usual spring barrel generally designated 294. This spring drive device is wound up by the traverse of 252 to the right and causes a movement of 252 to the left under spring action. The rack 252 also has associated with it an escapement mechanism 295 having a dog 295a. This escapement is more fully described in Schaaff Patent No. 1,426,223, dated August 15, 1922, and in the Lee and Phillips Patent No. 1,772,186. Removably secured to the card carriage rack 252 is a skip bar 296 provided with a notched portion 297 which permits skip lifter lever 298 to descend when in the notch or to remain elevated when riding on the high part of the bar. When the skip lifter lever descends into the notch it allows the dog 295a of the escapement mechanism to cooperate with the ratchet teeth of rack 252. With the skip lifter lever 298 riding on the top of the skip bar 296, the escapement will be disabled so that the card carriage rack 252 can traverse without stopping at each card column until the notch 297 is reached. Thereafter there is an intermittent motion of the card carriage to the left under spring action under escapement control. When the skip lifter lever again rides out at the notch the card carriage rack 252 takes its full excursion to the left. The location of the beginning of notch in the skip lifter bar determines the position for the beginning of result punching. When the escapement dog is lifted up certain contacts are opened as is customary in machines of this class. These contacts are designated 457.

The punching mechanism proper need not be fully described as it is fully set forth in the Lee and Phillips patent above referred to and in British Patent No. 362,529, which corresponds to the Lee and Daly United States Patent No. 1,976,618. In brief, the punching mechanism comprises a number of punches 300, which punches are adapted to be depressed to actuate the card under the control of interposers, not shown, which interposers are under the control of the punch selector magnets. The details of the punching mechanism are also fully set forth in the United States patent to George F. Daly and James M. Cunningham, No. 2,097,145, dated October 16, 1937.

Referring to Fig. 9, disposed alongside the card carriage rack 252 and fixed to the frame of the machine is a block or strip of insulating material designated 311. Disposed in this block of insulating material are a number of spots 312 of conducting material and alongside these spots is a common strip of conducting material 313. A suitable bridging piece or multiple brush assembly 314 is carried by the card carriage rack 252 and as the card carriage rack moves the bridging brush 314 is displaced and establishes circuit connections from the common bar 313 to one of the spots 312 depending upon the columnar position of the card carriage rack 252. For accuracy of spacing, the conducting spots 312 are placed in two rows, the spots of the lower row being interstaggered with the spots on the upper row as shown in Fig. 9.

Card ejector

Referring to Fig. 9, after the card has reached the R—1 position and has been traversed past the punches 300 and has been punched, it ultimately reaches a position at the extreme left hand end of the punching section of the machine, from which point it must be discharged into a discharge hopper. The card eject mechanism is shown in Fig. 9 with the parts shown in the position which they assumed before the machine was started in operation. Upon the first card feeding operation through the punching section of the machine, rack 251 will have moved towards its extreme left position. After reaching the dotted line position shown in Fig. 9, 251 moves further to the left and thrusts a rack 330 to the left compressing coil spring 331. Bearing against a shoulder on rack 330 is a contact operating part 332. When 330 is thrust to the left, contacts P—3 which were previously closed will open under their own spring action. The displacement of rack 330 to the extreme left position will, through intermediate gears 335, rock a shaft 336 in a clockwise direction to bring in ejector clip assemblage 337 away from the position shown in Fig. 9 to a position in which the ejector clip can receive a card which has been advanced through the punching section of the machine. With the ejector clip assemblage 337 disposed in such card receiving position the assemblage will be latched in such position by a latch 337a, which latch is fully described in British Patent No. 362,529 (see latch 216 of that patent, Fig. 16). The ejector clip latch is adapted to be released by an ejector clip magnet 320 also shown in the aforementioned British Patent No. 362,529 and in the circuit diagram, Fig. 21c. The action of the ejector assemblage may be briefly stated to be as follows. Upon energization of the card eject magnet 320 (Figs. 9 and 21c), latch 337a is released so that the ejector clip assemblage which has then grasped a card, swings from the card receiving position to the position shown in Fig. 9, in which position the jaws of the ejector are opened up so that the card can be discharged therefrom.

Contact devices and punching section of the machine

Contact devices P—3 controlled by 330 have been described. In the punching section of the machine there are also contacts P—2 and P—4. Such contacts are operated as follows. An extension 345 on rack 252 is adapted when rack 252 has passed beyond the last card column position, to close contacts P—2 and open contacts P—4. It will be understood that contacts P—2 are opened and contacts P—4 are closed when rack 252 is in any of the positions to the right of the position beyond the last column position.

At the opposite end of the machine are contacts P—1 (see Fig. 9a). Such contacts are normally closed with the rack 251 in the position shown and such contacts automatically open up upon movement of 251 to the left from the position shown. Such contacts furthermore remain open during the complete traverse of 251 to the left and back to its starting position. Contacts P—5 are normally open contacts and close when rack 251 completes its traversing movement to the left.

RH—LH readout

Fig. 17 shows the general arrangement of the readout for the LH and RH accumulator. With this readout mechanism it will be noted that the segment spots 401 are common to two sets of brushes designated 402 and 403, respectively and which brushes cooperate respectively with the conducting segments 404 and 405. Brush 402 as shown in Fig. 17 is driven from the units order clutch gear 406. Brush 403 is driven from the tens order clutch gear 407 by the gearing diagrammatically illustrated. A similar arrangement of brushes and readout spots is provided for the relatively higher orders for the LH and RH accumulator. The various segments of the readout mechanism are transversely connected by transverse buses generally designated 408 in Fig. 18.

Circuit diagram

In the operation of the machine the cards with the multiplier and multiplicand factors prepunched thereon, are first placed in the card magazine 79. The machine is then set into operation and this is brought about by closing the switch 410 providing a source of current supply for the main driving motor 50. Rotation of the motor 50 (Fig. 21a) starts the drive of the A. C.-D. C. generator 52 and supplies direct current to the buses 411 and 412 and alternating current to the bus 413 (see Figs. 21a and 21c). Start key 414 (Fig. 21c) is now depressed which completes a circuit from the 412 side of the D. C. line through relay coil C, through card lever contacts 82 now closed to the other side 411 of the D. C. line. The energization of relay coil C closes relay points C—1 and establishes a stick circuit through the stop key contacts 415 now closed. The energization of coil C also closes relay points C—2. A circuit is thereupon established from the 412 side of the D. C. line, through relay points D—3 now closed, through cam contacts CC—4 which close at the proper time in the cycle, through the picker clutch magnet 75 and through the accumulator reset magnet 416 through the relay points C—2 now closed, through the punch contacts P—2 and P—1 now closed to the other side of the D. C. line. Energization of reset magnet 416 brings about the reset of the RH, LH accumulator. The energization of picker clutch magnet 75 calls the picker into action so that a card is fed from the card magazine 79 and carried over to the R or sensing station of the machine. At the proper time in the cycle of rotation of the picker shaft 76 (Fig. 8a) cam contacts FC—1 close. Upon closure of these contacts a circuit is established through relay points D—3 now closed, through sensing mechanism clutch magnet 93, back through FC—1 and through P—3 and P—1 to the other side of the D. C. line 411. The sensing mechanism is now brought into operation and the sensing brushes are brought down into contact with the card at the R position in the sensing station. On account of the relation of the gearing shown in Fig. 8a, it will be understood that while one revolution of the shaft 88 will cause the sensing mechanism to be brought down into contact with the card and will afterwards cause the sensing mechanism to be restored to normal elevated position that the arrangement and relation of the drive and of the cam 89 is such that the sensing brushes will be maintained in contact with the card for a plurality of revolutions of the counter drive shaft 56 and 56a. It is during this period of dwell when the sensing brushes are in contact with the card that multiplication is effected. Just after the sensing brushes have contacted with the card, cam contacts T—1 make, thereby energizing relay D. Energization of relay coil D closes relay points D—1 and establishes a circuit from the left side of the D. C. line 412 through relay points D—1 and through the column shift clutch magnet 120, through cam contacts CC—3 which close at the proper time in the cycle and through cam contacts CS—1 which are initially in closed position. The energization of magnet 120 calls into action the one revolution clutch for the CS commutator 122 (Fig. 8a) and such commutator now makes one complete cycle of rotation. Such complete cycle of rotation of the commutator 122 requires a plurality of revolutions of the main counter drive shaft 56 and its associated shaft 56a. In practice and according to the present embodiment, eight counter shaft revolutions produce one complete revolution of the commutator 122. The machine is now ready to multiply.

The energization of relay coil D in the manner previously described has also closed relay points D—2 (Fig. 21b). A circuit is thereupon established from the 413 bus of the A. C. line through relay points D—2 to a line 417 which is provided with two brushes 418 and 419 cooperating with the conducting segments 420 and 421 of the CS commutator 122. It will be understood that brushes 418 and 419 are two brushes of the 124 group (see Fig. 5). With commutator 122 in starting position, a spot 422 is live and current accordingly flows from the line 417 through brush 418, common segment 420, out through spot 422, through a brush 423 (of the 123 group) to a line 424 which leads up through the CR relay coil and back to ground through cam contacts CC—2. Another circuit is established from line 417, through brush 419, common segment 421, through spot 425 to a circuit 426 which leads up through a plug connection at plug board 427 to the units order common conducting block 110 designated 110u on the circuit diagram and thence out via one of the brushes 106 pertaining to the multiplier, through a plug board 428 to a particular wire of the 429 group corresponding to the perforation which is in the units order column of the multiplier and to one of the X multiplier magnets. If the multiplier were 6 for example, the circuit would be established through to the X—6 multiplier magnet and back to ground through cam contacts CC—1. Such contacts close at the proper time in the cycle. Energization of the X magnet for example X—6, permits the related multiple relay points of the multiplier control relay (see Fig. 21a) to close at the proper time in the cycle of the machine and multiplication is thereupon effected by the amount in the units order of the multiplier. Multiplication is effected by the emitter 152 emitting impulses through a set of impulse lines 430 through the multi-contact relays of the multiplier relay to the RH lines designated 431RH. It will be remembered that the circuits to the 431LH lines are interrupted inasmuch as relay coil CL was not energized. Relay coil CR, however, is energized and circuits are established from the 431RH lines through the contacts associated with controlling relay CR to a set of lines 432, which extend down to a plug board 433. From the other side of the plug board, circuits are provided which extend to the transverse buses 434 of the multiplicand sensing device.

It will be remembered that 106a are the brushes of this multiplicand sensing device. The impulses flow out through the sensing device under the control of the perforations in the multiplicand field of the card and ultimately flow through a plug board generally designated 435 to a number of wires 436, 437, 438 and 439. These wires extend to brushes which may for convenience have the same reference numeral and extend to segments 436u, 437t, 438h, and 439th.

It will be remembered that the present step of the multiplying computation is to multiply by the units order of the multiplier and the first part of the computation is to take care of the RH partial product components. Current impulses flow from the respective segment spots 440 pertaining to the units, tens, hundreds, etc., and flow out through these segment spots to the units, tens, hundreds and thousands brushes, generally designated 441 to the proper order of the lines 442 which lead to the counter magnets 443 of the accumulator and thence back to ground. The differential impulses now flow through the various lines and enter into the accumulator the RH partial product component of the multiplication of the entire multiplicand times the units order amount of the multiplier. This operation takes one counter cycle. On the following counter cycle the commutator 122 shifts one increment of rotational movement. Such shifting movement correlates a segment 444 with a brush 445 and directs current through a line 446 to the CL multi-contact relay magnet. At the time CL is energized coil CR is de-energized and for a succeeding multiplying operation there is an alternating energization of CR and CL during the ensuing multiplication cycles. The shift of the commutator 122 also establishes a circuit from spot 447 to the 426 line and there is another energization of the X magnet followed by another emission of impulses from 152 through the multi-contacts which are tripped by the X magnet to the 431LH group of lines and thence down through the multiplicand sensing device to the commutator as before and to the first of the spots 448, etc. The commutator having shifted there is a proper and related and directed LH entry into the accumulator which is relatively one column further to the left than the previous entry of the RH component. The machine has now by the second counter cycle entered the LH component of the multiplication of the entire multiplicand by the units order of the multiplier into the accumulator. The column shifting commutator is again shifted for the next counter cycle and at this time a spot 449 is rendered live, which directs the next entry to a line 450 which leads up to the 110t common segment of the multiplier sensing device. The operations are then repeated, there being an entry first of the RH component of the tens order of the multiplier times the multiplicand followed by an entry of the LH component of the partial product and so on.

It may be explained that the CS commutator has four groups of spots designated group 1, 2, 3 and 4 on Fig. 21b and upon the timing diagram Fig. 20. The number 2 group has multiple sections, four in the present embodiment. Group 3 including spots 422 and 444 is provided to alternately energize the relay coils CR and CL to alternately permit the entry of RH components of partial products and LH components of partial products. The next four sections of the CS commutator to the left (group 2) which includes 440 and 448, etc., are arranged to direct the first entry into the lines of the accumulator which are relatively in the highest orders and upon the next computation to effect a shift one column to the left, which computation is representative of an LH partial product. Upon the next shift of the commutator, the circuit relations to the accumulator are maintained for the following RH component entry pertaining to the tens order of the multiplier. Following this there is another shift pertaining to the LH component of the tens order of the multiplier with a following maintained relation for the succeeding RH component pertaining to the hundreds order and so on. The extreme left hand section (group 1) of the commutator is adapted to successively direct current flow first to the units order of the multiplier sensing mechanism then two cycles later to the tens order and so on. After the multiplying computation has been completed and the entire group of RH and LH components have been entered into the accumulator the holding circuit to relay coil D is interrupted by the opening of cam contacts T—2 (Fig. 21c). The de-energization of D opens up relay points D—2 and terminates multiplying computations. Slightly later in the cycle of operation in the machine, spot 451 (Fig. 21b) is rendered live, current flowing from the 411 side of the D. C. line through contacts P—2, through the brush 452, segment 453, spot 451, brush 454, circuit 456 to the punch rack clutch magnet 275 and back to the other side of the D. C. line 412. A card is now fed into the punching section of the machine from the R to the R—1 station in the punch. At the time of this card feed, the sensing brushes will have been elevated from the card. When the card is in the R—1 position, contacts P—5 close. Upon closure of these contacts P—5, current flows from the 411 side of the D. C. line through P—5 back to the other side of the D. C. line, through coil B, energizing this coil and closing relay points B—1. Relay coil B is maintained energized by a holding circuit through relay points B—1 and contacts P—4 on the punch now closed. Energization of relay coil B also closes relay points B—2 (Fig. 21c) and current supply is provided through the customary escapement contacts 457 of the punch to the common strip 313. The card moves column by column under the control of the escapement in the usual manner and the amount standing in the RH and LH accumulator is read out to the punch by means of the brush 314, which traverses the spots 312 in the common conducting strip 313, and supplies current through a plug board 458 to the LH—RH readout device and therethrough to the punch selector magnets 459. During punching operations a circuit is established to the punching magnet 460 through the punch magnet contacts 461. Such punch magnet and the punch contacts are those customarily used in punching machines of this class.

After the punching operation is completed, the rack 252 skips to beyond the last column position causing contacts P—4 to open and P—2 to close. The closure of contacts P—2 causes an energization of eject magnet 320 through a circuit, through relay points D—3, eject magnet 320, P—2 and back to the D. C. line. Energization of the eject magnet causes the eject of the previously punched card from the punch. After the card is ejected, contacts P—3 close and the closure of these contacts re-energize the picker clutch magnet 75 and the counter reset magnet 416 and initiate a new card handling and computing cycle.

It may be explained that the energization of coil D opens up relay points D—3 and prevents energization of 75 during the computing cycle of the machine. The opening up of points D also prevents the undesired energization of the reset magnet and also breaks the circuit to the eject magnet 320 during computing cycles.

It will be understood that with the present machine, the machine operates with a fixed cycle arrangement and it operates with a single accumulator. For multiplying a four by four type of computation, such as 4259 times 4786, the machine requires eight counter cycles, two counter cycles being required for each order of the multiplier, the first cycle being required for entering an RH component and the second cycle being required for entering an LH component in a given order of the multiplier.

The sensing mechanism is arranged to hold the brushes in sensing relation to the card for eight complete counter cycles and while its cam is driven with a nine to one relation to the counter drive shaft of the machine, the extra cycle is utilized for bringing the sensing devices down into cooperation with the card and out of cooperation with the card.

The control circuits to the punch are such that an indeterminate number of counter cycles may be provided for punching and that a new card feed will be delayed until punching is complete and until the card is ejected and until the punched parts are in proper position for receiving a new card.

The timing diagram shown in Figs. 20 and 20a requires no detailed description. In connection with this diagram, however, it may be explained that the first zone to the left shows the card feed and related actions. The second zone shows the beginning of multiplication. The multiplication takes, in the present machine, eight counter cycles of which three are shown on the timing diagram, two being shown on Fig. 20 and one being shown on Fig. 20a. Following the multiplying cycle there are the cycles which are consumed by the punching operations, here shown as two, but it will be understood that such cycles are indeterminate in number depending upon the time required for punching.

The present application constitutes a continuation in part of certain subject matter shown in my copending applications Serial No. 242,680, filed December 27, 1927, and Serial No. 559,946, filed August 28, 1931, now United States Patent No. 2,178,951, dated November 7, 1939.

Various forms of relay devices are used in the present machine. Some of the relays are purely electrical relays such as the relays with coils B, C, etc., and contacts B—1, C—1, etc. Other relays are the electromagnetically tripped, but mechanically controlled and restored multi-contact type. Such relays are those used for multiplier selection and control purposes such as those with coils X, CL and/or CR.

What I claim is:

1. In an accounting machine comprising computing means, a punching device having devices for the endwise feed of cards therethrough from an entering end to the exit end of said punching device, means for feeding a card into the entering end of the punch and in a direction at right angles to the aforesaid endwise feed and to a predetermined sensing station, sensing devices at such station, means for temporarily retaining the card at the sensing station while computing operations are being effected under the control of the sensing devices, and means operative upon the completion of a computation for initiating the endwise feed of the card away from the sensing station.

2. The machine according to claim 1 wherein the punching device is of the column by column type, and wherein the endwise feed devices include an escapement mechanism for escaping the record step by step for punching the result of the computation digit by digit.

3. A record controlled multiplying machine of the partial product type comprising a single accumulator into which both the right and left hand components of partial products are entered upon formation of the same, a record sensing mechanism in which a record is retained during the multiplying computation while partial products are being formed and accumulated, means controlled by the record sensing mechanism for controlling the formation and entry of partial product components into the single accumulator, record punching mechanism, a record supply magazine, a picker for feeding a record longitudinally from said magazine and advancing the same directly into the record sensing mechanism, means effective upon completion of the multiplication for feeding each record step by step and column by column through the record punching mechanism in a direction at right angles to the advance of the record from the supply magazine, and punching mechanism controlled by said accumulator for punching the product standing thereon column by column upon the record as it is fed through the punching mechanism.

4. A record controlled and record making accounting machine with a supply magazine for a plurality of records, a record sensing station and record sensing means at such station, accumulating means, multiplying means for controlling said accumulating means, a record feeding device for feeding a record from a supply magazine directly to the record sensing station, means for thereupon operating the record sensing means and for retaining the record at the sensing station during the entire computation, means operative while the record is so retained for controlling the multiplying means directly from the record, a punching mechanism, means effective upon completion of an entire computation for advancing the record through said punching mechanism to punch the result of the computation thereon, means for ejecting the record from the punching mechanism, and means controlled by the ejecting means upon ejection of a record for re-initiating operation of the record feeding device to feed the next following record to the sensing station.

5. A multiplying machine with accumulating means controlled by differentially timed impulses, differentially timed impulse emitting means, factor signifying means for the multiplier and the multiplicand, switching means controlled by the multiplier signifying means capable of concurrently and selectively transmitting differentially timed impulses representative of both left hand and right hand components of partial products from said emitting means through the multiplicand signifying means to the accumulating means, further switching means intermediate the first mentioned switching means and the multiplicand factor signifying means for suppressing transmission of left hand components of partial products to the accumulator while right hand components of partial products are being transmitted and vice versa, and means operable during partial product transmission into the accumulator for controlling alternate operation of said switching means.

6. A record controlled accounting machine including a product accumulator, record sensing means for sensing multiplier and multiplicand factor data on a record, an impulse emitter for emitting differentially timed impulses onto a set of digit lines, multiplying relays for selectively and concurrently transmitting impulses representative of right and left hand partial product components from said emitter to a set of right hand component lines and to a set of left hand component lines, means for controlling said multiplying relays from the multiplier sensing means, switching means for alternatively enabling transmission of right hand component impulses and left hand ocmponent impulses from said component lines through the multiplicand sensing means to the product accumulator, column shift means for variably routing entries into the accumulator, and means controlled by said column shift means for controlling said last mentioned switching means.

JAMES W. BRYCE.